US012800087B2

(12) United States Patent
Jin et al.

(10) Patent No.: US 12,800,087 B2
(45) Date of Patent: Nov. 17, 2026

(54) SUPPORT APPARATUS FOR STORING OBJECT

(71) Applicants: Hyundai Motor Company, Seoul (KR); Kia Corporation, Seoul (KR)

(72) Inventors: Taek Seong Jin, Hwaseong-si (KR); Ju Young Yoon, Hwaseong-si (KR); Ho Jun Kim, Hwaseong-si (KR); Seung Jun Lee, Hwaseong-si (KR); Hyun Seop Lim, Hwaseong-si (KR); Kyu Jung Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 37 days.

(21) Appl. No.: 18/935,886

(22) Filed: Nov. 4, 2024

(65) Prior Publication Data

US 2025/0361972 A1 Nov. 27, 2025

(30) Foreign Application Priority Data

May 22, 2024 (KR) ........................ 10-2024-0066623

(51) Int. Cl.
*F16M 11/04* (2006.01)
*B25J 9/00* (2006.01)
(Continued)

(52) U.S. Cl.
CPC .......... *F16M 11/041* (2013.01); *B25J 9/0009* (2013.01); *F16B 2/10* (2013.01); *F16B 2/12* (2013.01); *F16M 11/42* (2013.01)

(58) Field of Classification Search
CPC ..... F16M 11/041; F16M 11/42; B25J 9/0009; F16B 2/10; F16B 2/12
See application file for complete search history.

(56) References Cited

U.S. PATENT DOCUMENTS 8,567,804 B1 * 10/2013 Hoenhause ............ A61G 5/122 280/220
10,130,547 B2 * 11/2018 Koren .................. A61H 1/0244
(Continued)

FOREIGN PATENT DOCUMENTS

CN 114869702 A * 8/2022 ............. F16M 11/42
CN 115517912 A * 12/2022 ........... A61H 1/0262
(Continued)

OTHER PUBLICATIONS

Renishaw RLS magnetic encoders enable Marsi Bionics to build 'life-changing' exoskeletons, issued on May 2020 (Year: 2020).*
(Continued)

*Primary Examiner* — Terrell L Mckinnon
*Assistant Examiner* — Ding Y Tan
(74) *Attorney, Agent, or Firm* — Slater Matsil, LLP

(57) ABSTRACT

A support apparatus for storing an object can include a main rod supported by a floor or wall surface, a coupling unit provided at an end of the main rod, and a support frame supported by the main rod and movably coupled to the coupling unit so that a center of gravity is movable, in which the support frame includes a support part having an upper surface on which a predetermined object is capable of being placed, and a guide part extending from one side of the support part in a horizontal direction and configured such that the coupling unit is slidably coupled to the guide part.

20 Claims, 14 Drawing Sheets

(51) Int. Cl.

| | |
|---|---|
| ***F16B 2/10*** | (2006.01) |
| ***F16B 2/12*** | (2006.01) |
| ***F16M 11/42*** | (2006.01) |

(56) References Cited

U.S. PATENT DOCUMENTS

| | | | | |
|---|---|---|---|---|
| 10,137,050 | B2 * | 11/2018 | Goffer | A61H 1/0262 |
| 2014/0265496 | A1 * | 9/2014 | Magelund | A61B 90/60 297/313 |
| 2018/0296426 | A1 * | 10/2018 | Kappel | A61H 3/02 |
| 2020/0281803 | A1 * | 9/2020 | Teng | A61H 1/0262 |
| 2021/0275379 | A1 * | 9/2021 | Kim | B25J 9/0006 |
| 2023/0329956 | A1 * | 10/2023 | Kim | A61H 3/008 |

FOREIGN PATENT DOCUMENTS

| | | | | | |
|---|---|---|---|---|---|
| CN | 218943793 | U | * | 5/2023 | A61H 3/00 |
| CN | 117798889 | A | * | 4/2024 | B25J 9/0006 |
| KR | 101429740 | B1 | * | 8/2014 | B25J 9/0006 |
| KR | 20150012347 | A | | 2/2015 | |
| KR | 20210106779 | A | * | 8/2021 | F16M 11/42 |
| KR | 102369290 | B1 | | 3/2022 | |
| WO | WO-2019160206 | A1 | * | 8/2019 | A61H 3/04 |

OTHER PUBLICATIONS

SKYFI youtube video for ATLAS 2030 Marsi Bionics dated Nov. 7, 2023, https://www.youtube.com/watch?v=O9L-38icoSw (Year: 2023).*

Hyundai motor robotics lab X-ble MEX online product post dated Jun. 15, 2023 (Year: 2023).*

Dogonews online posting by Maitreyi titled "Hyundai Unveils Stylish Iron Man-Inspried Robotic Suits" dated Jan. 27, 2017 (Year: 2017).*

* cited by examiner

SUPPORT APPARATUS FOR STORING OBJECT

CROSS-REFERENCE TO RELATED APPLICATIONS

This application claims priority to and the benefit of Korean Patent Application No. 10-2024-0066623 filed in the Korean Intellectual Property Office on May 22, 2024, the entire contents of which are incorporated herein by reference.

TECHNICAL FIELD

The present disclosure relates to a support apparatus for storing an object.

BACKGROUND

A support apparatus or structure may be used to store an object having a complicated structure or shape. For example, a robot, which is intended to be worn on a person's body, may include a waist wearable part capable of being worn on a user's waist or back, and a lower-limb wearable part capable of being worn on the user's leg. The robot is stored while being suspended from a support apparatus or structure in a state in which the robot stands on a ground surface so that the robot is easily detached from the user and stored.

The support apparatus in the related art generally includes a base frame configured to be supported by a ground surface or a wall surface, and a cantilevered beam extending outward from the base frame and having an end side from which the robot may be suspended. However, because the base frame and the end of the cantilevered beam of the support apparatus in the related art are spaced apart from each other, the support apparatus has difficulty in stably supporting the robot. In some instances, there may occur a problem in that the support apparatus may turn over.

Further, the wearable robots often have articulated structures for implementing motions of the users. For this reason, a shape of the wearable robot may not be fixed, and a position of a center of gravity thereof may be variously changed. However, because the cantilevered beam and the base frame of the support apparatus in the related art are fixed, the support apparatus sometimes cannot stably support the robot in accordance with the shape and the position of the center of gravity of the robot.

Therefore, there has been an acute need to develop a support apparatus for storing an object that is capable of stably supporting and storing objects having various structures or shapes by use of a supporting force of a floor or a wall surface.

SUMMARY

The present disclosure relates to a support apparatus for storing an object, and more particularly, to a support apparatus for storing an object that serves to support and store an object with a supporting force of a floor or a wall surface.

An embodiment of the present disclosure can solve the above-mentioned problem, and an embodiment of the present disclosure can provide a support apparatus for storing an object that is capable of stably supporting objects having various shapes or structures by use of a supporting force of a ground surface or a wall surface.

Technical problems that can be solved by an embodiment of the present disclosure are not necessarily limited to the above-mentioned technical problems, and other technical problems, which are not mentioned above, may be understood from the following descriptions by those skilled in the art to which the present disclosure pertains.

An embodiment of the present disclosure can provide a support apparatus for storing an object, and the support apparatus can include: a main rod supported by a floor or wall surface; a coupling unit provided at an end of the main rod; and a support frame supported by the main rod and movably coupled to the coupling unit so that a center of gravity is movable, and in which the support frame can include a support part having an upper surface on which a predetermined object is capable of being placed; and a guide part extending from one side of the support part in a horizontal direction and configured such that the coupling unit is slidably coupled to the guide part.

The support part may have a plate shape, and the guide part may be provided on a lower surface of the support part.

The guide part may extend from one end of the support part to the other end opposite to one end of the support part so that the guide part passes through a center of gravity of the support part.

The coupling unit may include: a sliding part coupled to the guide part and configured to be slidable in one direction; and a sliding fixing part coupled to the sliding part so as to be movable toward the guide part and configured to fix relative positions of the sliding part and the guide part.

A plurality of sliding fixing holes may be formed in the guide part and arranged in one direction, and the sliding fixing part may include: a sliding fixing body movably coupled to the sliding part; and a sliding fixing protrusion extending from the sliding fixing body and configured to be selectively inserted into any one of the plurality of sliding fixing holes.

The sliding fixing part may include a sliding fixing elastic member configured to press the sliding fixing body toward the guide part.

The sliding fixing part may include: a sliding fixing rod extending to the outside of the sliding part from the sliding fixing body; and a sliding fixing handle provided at an end of the sliding fixing rod.

The coupling unit may include a rotation base part provided at an end of the main rod and configured to support the sliding part so that the sliding part is rotatable.

The coupling unit may include a rotation fixing part coupled to the rotation base part so as to be movable toward the sliding part and configured to fix relative positions of the sliding part and the rotation base part.

A plurality of rotation fixing holes may be formed in the sliding part and arranged in a radial direction based on the main rod, and the rotation fixing part may include a rotation fixing body movably coupled to the sliding part and having one side configured to be selectively inserted into any one of the plurality of rotation fixing holes.

The rotation fixing part may include a rotation fixing elastic member configured to press the rotation fixing body toward the sliding part.

The rotation fixing part may include: a rotation fixing rod extending to the outside of the rotation base part from a lateral portion of the rotation fixing body; and a rotation fixing handle provided at an end of the rotation fixing rod.

The support apparatus may further include: a fixing unit coupled to one side of the support part and configured to fix the object placed on the upper surface of the support part, in which the fixing unit includes: a length adjustment part coupled to the support part so as to be movable in an outward direction and configured to adjust a distance by which an end of the length adjustment part is spaced apart from the support part; and a fixing part extending upward from the end of the length adjustment part and configured to fix the object placed on the upper surface of the support part.

The fixing part may be hingedly and rotatably coupled to the end of the length adjustment part.

The fixing unit may include an object fixing elastic member configured to press the fixing part toward the length adjustment part.

The main rod may include a plurality of sub-rod parts coupled to one another in series so that the plurality of sub-rod parts is attachable to or detachable from one another.

The support apparatus may further include a base frame capable of being placed on the floor, in which the main rod extends from the base frame.

The base frame may include: a base part configured to support the main rod and having a plate shape; and a wheel rotatably coupled to one side of the base part and configured to be rollable relative to the floor.

The main rod may be positioned to be biased toward the wheel from a central portion of the base part.

The main rod may include: a first rod part extending from the wall surface; and a second rod part extending upward from the first rod part, and the coupling unit may be provided at an upper end of the second rod part.

According to an embodiment of the present disclosure, a center of gravity of a support frame, on which a predetermined object is placed, may be moved in a horizontal direction relative to a main rod, such that objects with various shapes or structures may be stably supported and stored.

According to an embodiment of the present disclosure, a support frame may rotate relative to a main rod, and a direction of an object placed on the support frame may be appropriately changed, which may improve the convenience of use.

The advantages of embodiments of the present disclosure are not necessarily limited to the above-mentioned advantages, and other advantages, which are not mentioned above, may be clearly understood by those skilled in the art from the present specification and the accompanying drawings.

BRIEF DESCRIPTION OF THE DRAWINGS

FIGS. 4 and 5 illustrate horizontal cross-sections of a support part of a support frame so that a length adjustment part is visible.

FIGS. 12 and 13 illustrate vertical cross-sections of a sliding part and a rotation base part so that an interior of the sliding part and an interior of the rotation base part are visible.

DETAILED DESCRIPTION OF ILLUSTRATIVE EMBODIMENTS

Figure 1:
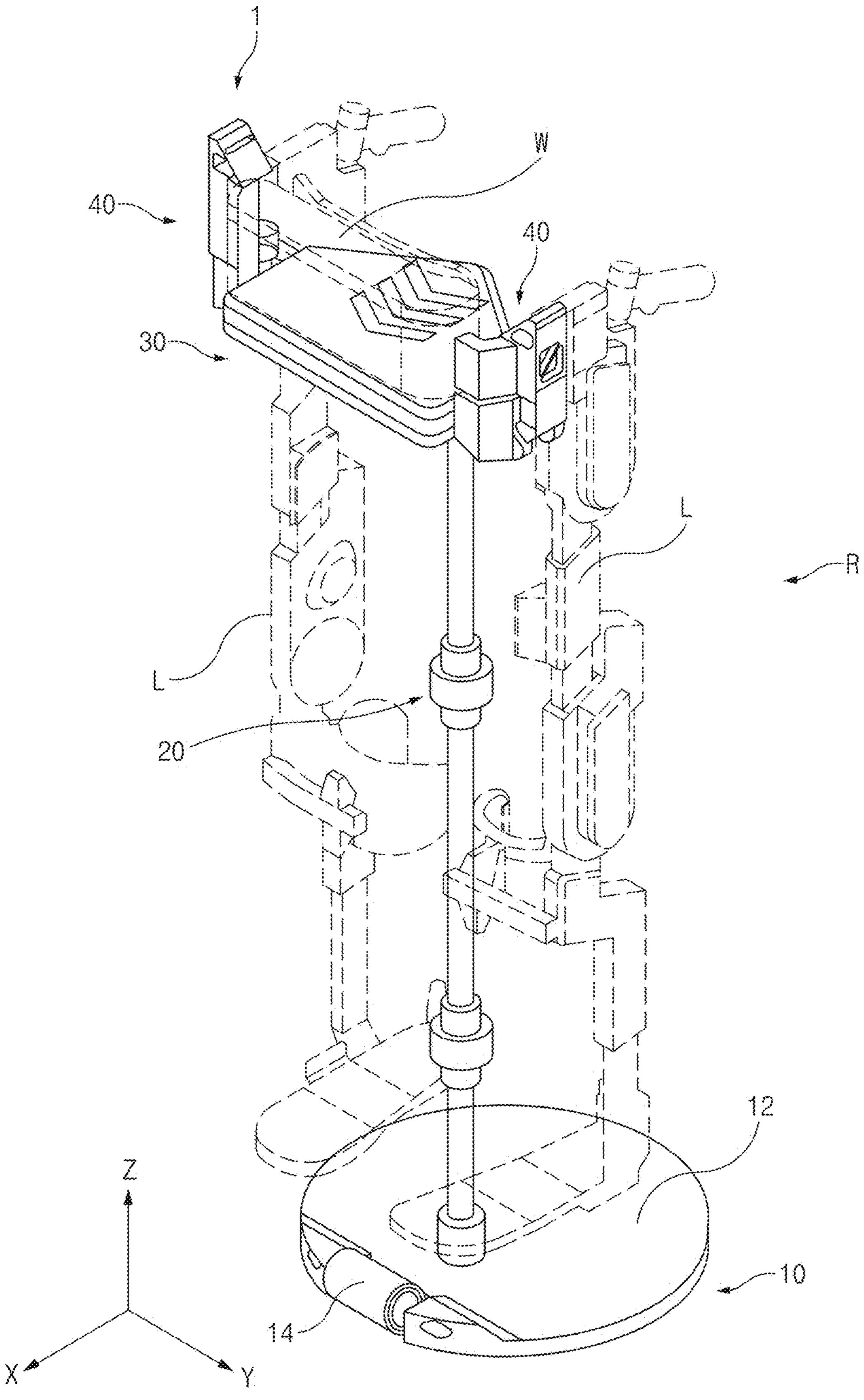
FIG. 1 is a perspective view illustrating a state in which a robot is stored by being supported by a support apparatus for storing an object according to an embodiment of the present disclosure when viewed from above.

Hereinafter, example embodiments of the present disclosure will be described in detail so that those with ordinary skill in the art may easily carry out the embodiments. However, embodiments of the present disclosure may be implemented in various different ways and is not necessarily limited or restricted by the example embodiments described herein.

A part irrelevant to the description can be omitted to clearly describe an example embodiment of the present disclosure. Further, the specific descriptions of publicly known related technologies can be omitted when it is determined that such specific descriptions may unnecessarily obscure the subject matter of the present disclosure. In assigning reference numerals to constituent elements of the respective drawings in the present specification, same or similar constituent elements can be designated by same or similar reference numerals throughout the specification.

In addition, terms or words used in the specification and the claims should not be interpreted as being limited to a general or dictionary meaning and should be interpreted as a meaning and a concept which conform to the technical spirit of the present disclosure based on a principle that an inventor can appropriately define a concept of a term in order to describe his/her own invention by the best method.

Figure 2:
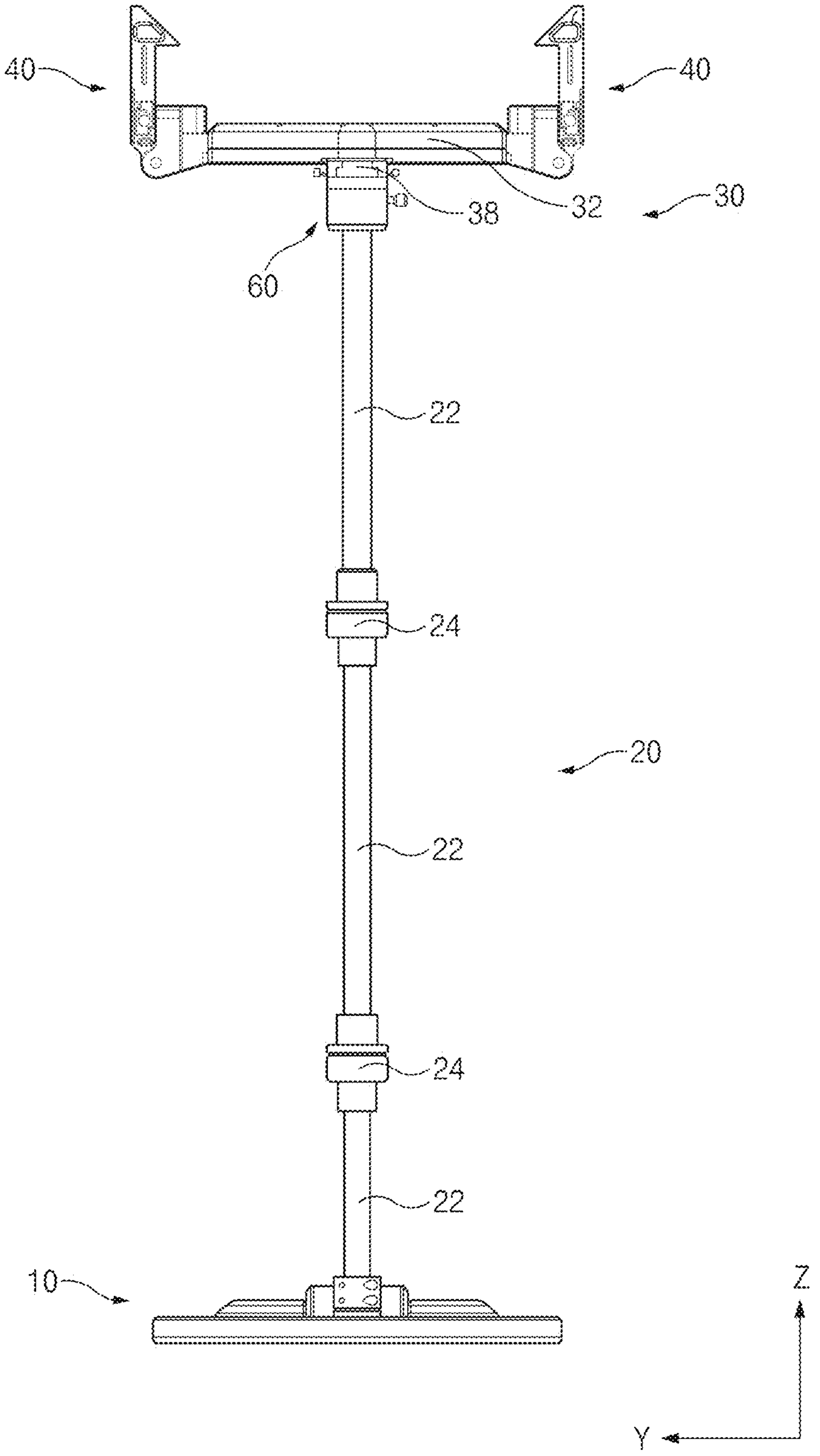
FIG. 2 is a front view of a support apparatus for storing an object according to an embodiment of the present disclosure.

FIG. 1 is a perspective view illustrating a state in which a robot can be stored by being supported by a support apparatus for storing an object according to an embodiment of the present disclosure when viewed from above. The robot is indicated by dotted lines, and components projected by the robot are indicated by solid lines. FIG. 2 is a front view of the support apparatus for storing an object according to the embodiment of the present disclosure.

FIGS. 1 and 2 illustrate a support apparatus 1 for storing an object according to an embodiment of the present disclosure. With reference to FIGS. 1 and 2, the support apparatus 1 according to the embodiment of the present disclosure may be an apparatus that supports an object so that the object may be stored at a predetermined location.

As illustrated, the support apparatus 1 may be used to support and store a wearable robot R. In the present disclosure, the wearable robot R may be a robot configured to be worn on a body and assist a motion of a user. The wearable robot R may include a waist wearable part W capable of being worn on the user's waist, and a pair of lower-limb wearable parts L capable of being worn on the user's leg.

In general, the wearable robot R may have an articulated link structure for implementing the user's free motion. The lower-limb wearable part L of the wearable robot R may often elongate upward and downward, and a center of gravity thereof may vary depending on relative positions of links in accordance with motions of joints.

For example, as illustrated in FIG. 1, a center of gravity of the wearable robot R may be positioned below the waist wearable part W in a state in which the lower-limb wearable part L is stretched upward and downward. However, a center of gravity of the wearable robot R may be positioned forward of the waist wearable part W (in a positive X-axis direction) in a state in which a knee portion of the lower-limb wearable part Lis bent. As described above, the wearable robot R having the complicated structure, the position of the center of gravity of which may be variously changed, can be difficult to support and store by use of a general structure.

Further, the wearable robot R may sometimes be supported so that a particular portion thereof is a free end spaced apart from the ground surface. For example, as illustrated, the lower-limb wearable part L may extend so that the lower-limb wearable part L is a free end at a lower side of the waist wearable part W (in a negative Z-axis direction). This configuration may prevent a joint or link structure of the lower-limb wearable part L from being damaged by being pressed by the ground surface and allow the user to easily wear the lower-limb wearable part L.

In the support apparatus 1 according to an embodiment of the present disclosure, a center of gravity of a support frame 30 for supporting the wearable robot R may be moved in a horizontal direction, such that the support apparatus 1 may stably support and store the wearable robot R having a complicated shape or structure, the center of gravity of which can be variable.

Further, in the support apparatus 1 according to an embodiment of the present disclosure, the support frame 30 may be supported by an upper end of a main rod 20 extending upward and downward, such that the lower-limb wearable part L may store the wearable robot R in the state in which the lower-limb wearable part L is a free end extending downward (in a positive Z-axis direction).

Hereinafter, constituent elements of the support apparatus 1 according to an embodiment of the present disclosure will be described specifically.

With reference to FIGS. 1 and 2, the support apparatus 1 according to an embodiment of the present disclosure may include a base frame 10. The base frame 10 may be a frame that supports the other constituent elements of the support apparatus 1 and stably support the wearable robot R supported by the support apparatus 1 by use of a supporting force of a ground surface or floor.

In an embodiment, the base frame 10 may include a base part 12. The base part 12 may have a plate shape so that the base part 12 may be stably placed on the floor. As illustrated, the base part 12 may have a circular plate shape. However, the shape of the base part 12 is not specially limited. For example, the base part 12 may be configured as a plate with a polygonal shape.

In an embodiment, the base frame 10 may include a wheel 14. The wheel 14 may be rotatably coupled to one side of the base part 12. The wheel 14 may be configured to be rollable relative to the floor. Therefore, the wearable robot R may move on the floor together with the base frame 10 and the other constituent elements of the support apparatus 1, which is supported by the base frame 10.

In an embodiment, the wheel 14 may be coupled to one rim side of the base part 12. As illustrated, the wheel 14 may be coupled to a rim portion of a front side of the base part 12 (based on the positive X-axis direction). However, a position of the wheel 14 is not specially limited and preferably the wheel 14 may move the base part 12.

With reference to FIGS. 1 and 2, the support apparatus 1 according to an embodiment of the present disclosure may include a main rod 20. The main rod 20 may be configured to transmit the supporting force of the base frame 10 to a support frame 30 to be described below.

In an embodiment, the main rod 20 may extend upward (in the positive Z-axis direction) from the base part 12 of the base frame 10. Therefore, the waist wearable part W may be supported on an upper end of the main rod 20 and stored in the state in which the lower-limb wearable part L having a long length elongates upward and downward (in the Z-axis direction).

In an embodiment, the main rod 20 may include a plurality of sub-rod parts 22 arranged to one another in series. The number of sub-rod parts 22 may be appropriately adjusted, as necessary/desired. For example, the sub-rod parts 22 may increase in number to store the wearable robot R having the lower-limb wearable part L having a length longer than illustrated.

In an embodiment, the main rod 20 may include rod coupling parts 24 configured to couple the adjacent sub-rod parts 22 so that the adjacent sub-rod parts 22 are detachable. The number of rod coupling parts 24 may be appropriately adjusted, as necessary/desired.

In an embodiment, the rod coupling part 24 may include a clamp type member configured to surround opposing ends of the sub-rod parts 22 arranged coaxially, and a fixing pin penetratively coupled to the clamp type member and configured to fix a position of the sub-rod part 22.

Because the plurality of sub-rod parts 22 of the main rod 20 of the support apparatus 1 according to an embodiment of the present disclosure may be detachably coupled to one another as described above, a height of the upper end may be freely adjusted, which may improve assemblability, installability, and storability of the support apparatus 1.

In an embodiment, the main rod 20 may be positioned on the base part 12 and biased toward the wheel 14. More specifically, the main rod 20 may be positioned at a position somewhat spaced apart from a center of the base part 12 toward the front side (based on the positive X-axis direction)

directed toward the wheel 14. This configuration may allow the main rod 20 and the wheel 14 to be positioned closer to each other, or as close to each other as possible, so that the movement may be more stably performed by the wheel 14.

In an embodiment, the three sub-rod parts 22 of the main rod 20 are illustrated in FIG. 2. However, the main rod 20 may be configured as a single rod. The rod coupling part 24 may not be provided.

In an embodiment, the sub-rod part 22 of the main rod 20 is illustrated in FIGS. 1 and 2 as a rod elongating upward and downward (in the Z-axis direction). However, as necessary, one section of the sub-rod part 22 may be bent, or the sub-rod part 22 may be configured to have different thicknesses or widths in a longitudinal direction.

Hereinafter, other constituent elements of a support apparatus according to an embodiment of the present disclosure will be described with reference to other drawings.

Figure 3:
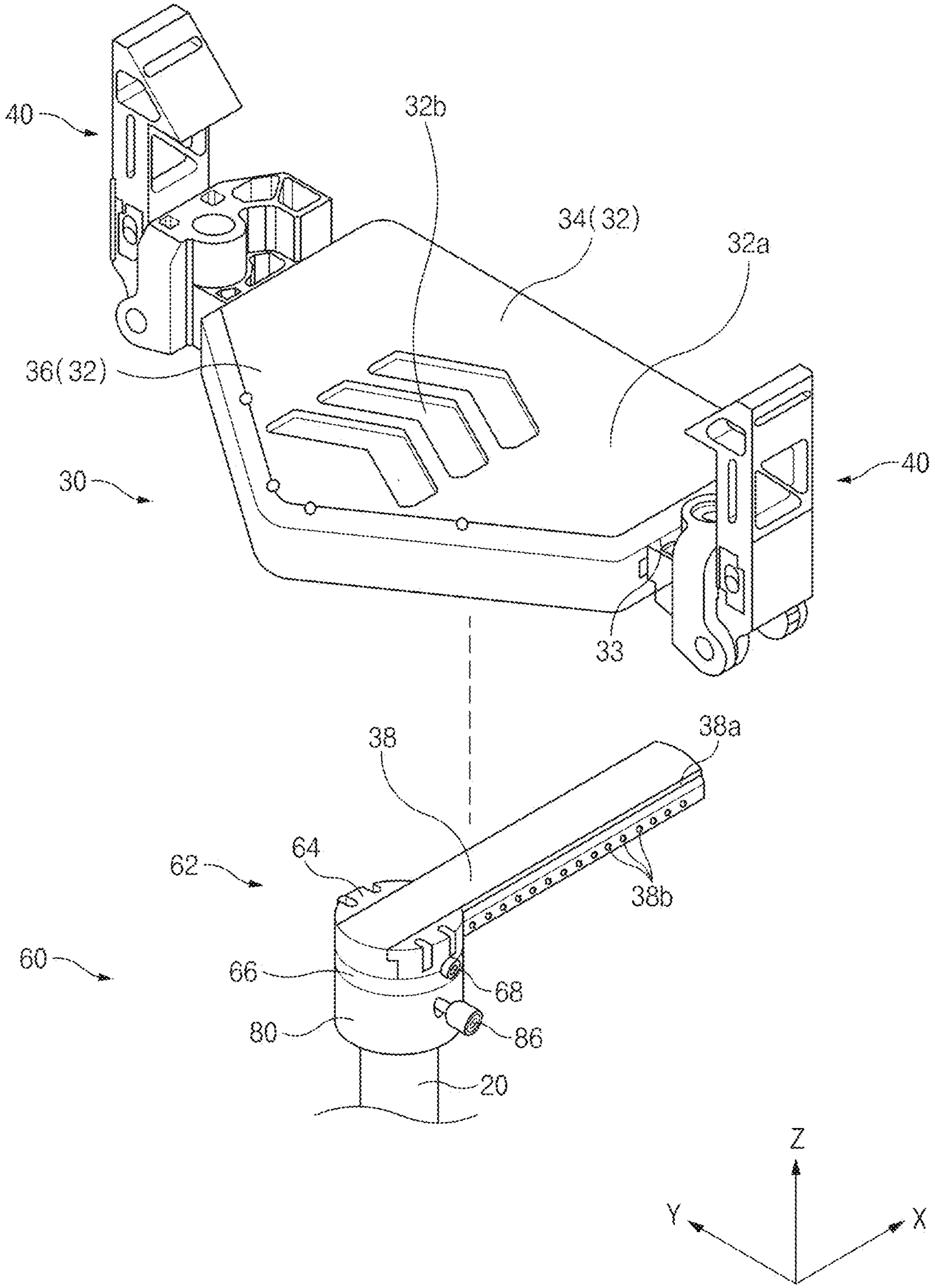
FIG. 3 is an exploded perspective view illustrating a part of a support apparatus for storing an object according to an embodiment of the present disclosure.
Figure 4:
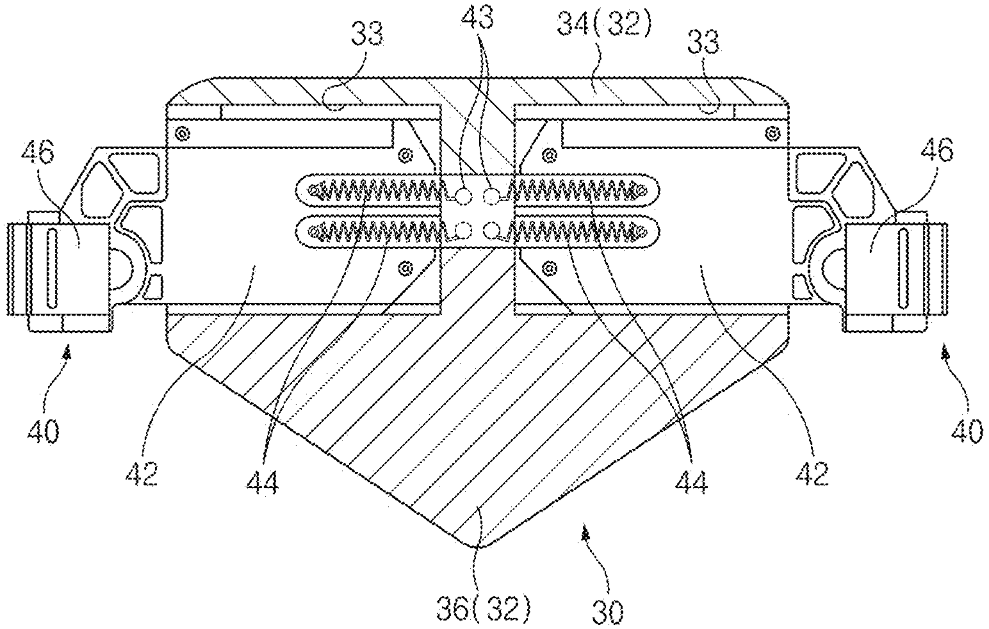
FIG. 4 is a top plan view illustrating a state in which a length adjustment part is adjusted to shorten a distance between a fixing unit and a support frame of a support apparatus for storing an object according to an embodiment of the present disclosure.
Figure 4:
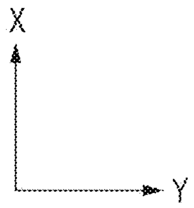
Figure 5:
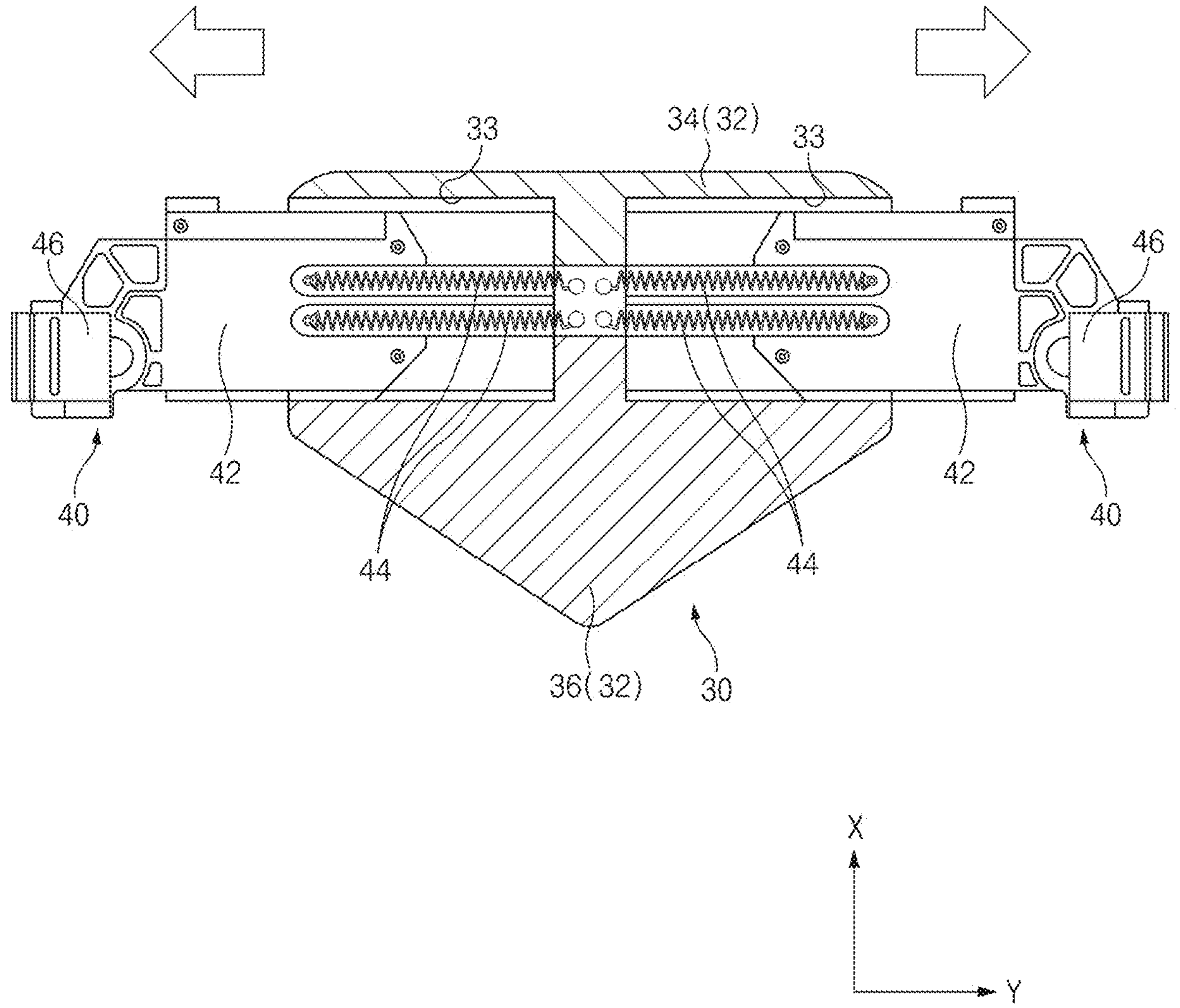
FIG. 5 is a top plan view illustrating a state in which a length adjustment part is adjusted to lengthen a distance between a fixing unit and a support frame of a support apparatus for storing an object according to an embodiment of the present disclosure.
Figure 6:
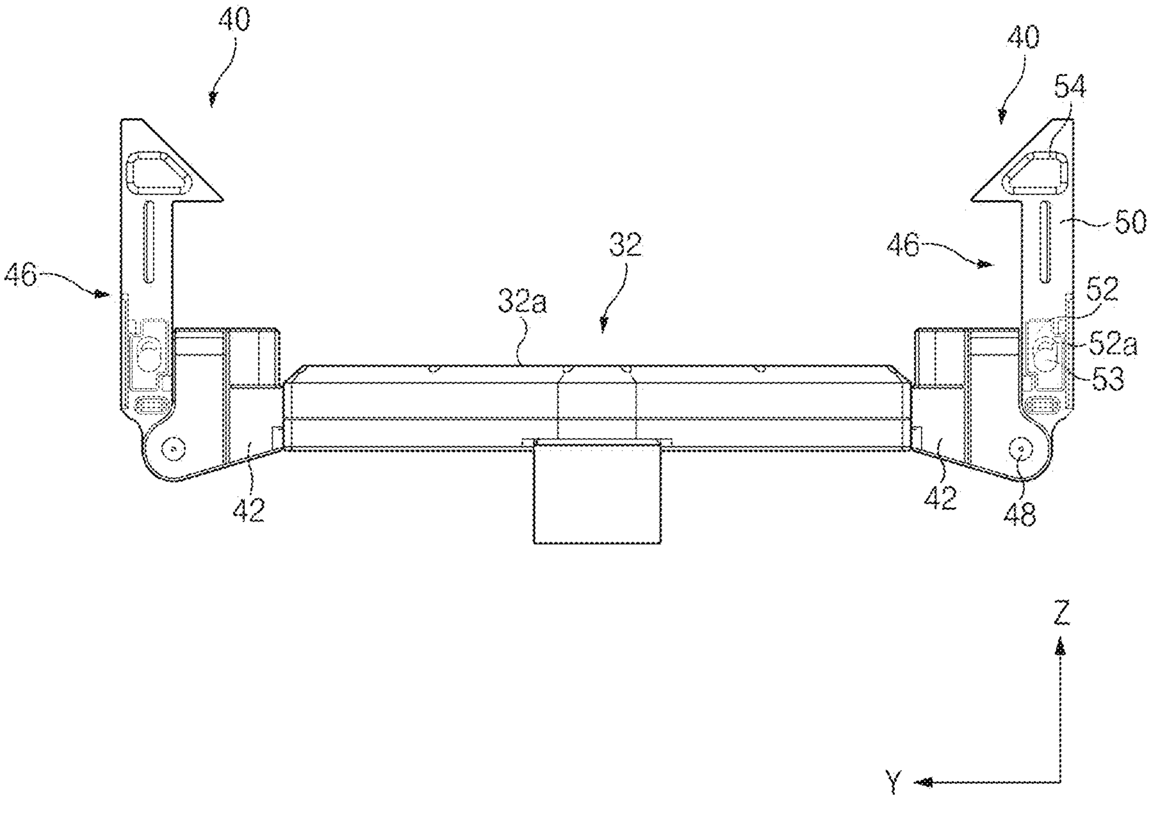
FIG. 6 is a front view illustrating a state in which fixing units of a support apparatus for storing an object according to an embodiment of the present disclosure are retracted toward a support frame.
Figure 7:
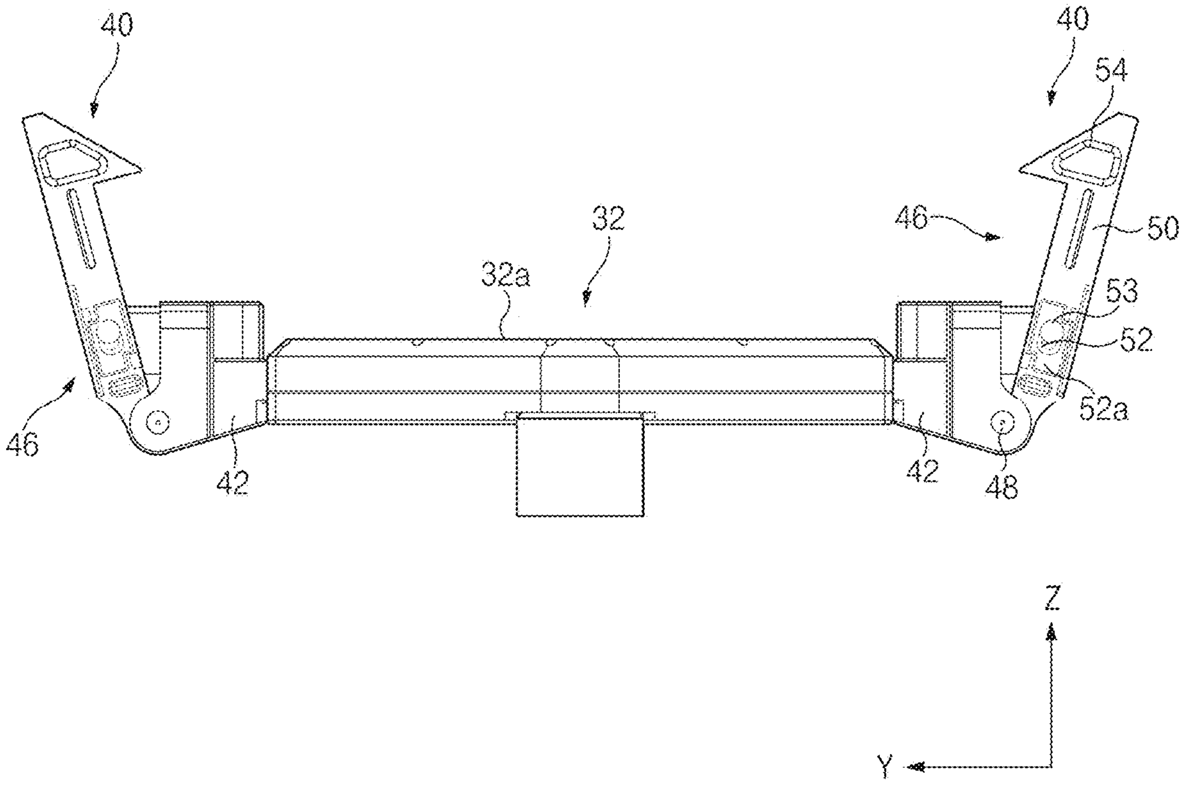
FIG. 7 is a front view illustrating a state in which fixing units of a support apparatus for storing an object according to an embodiment of the present disclosure are spread to the outside of a support frame.
Figure 8:
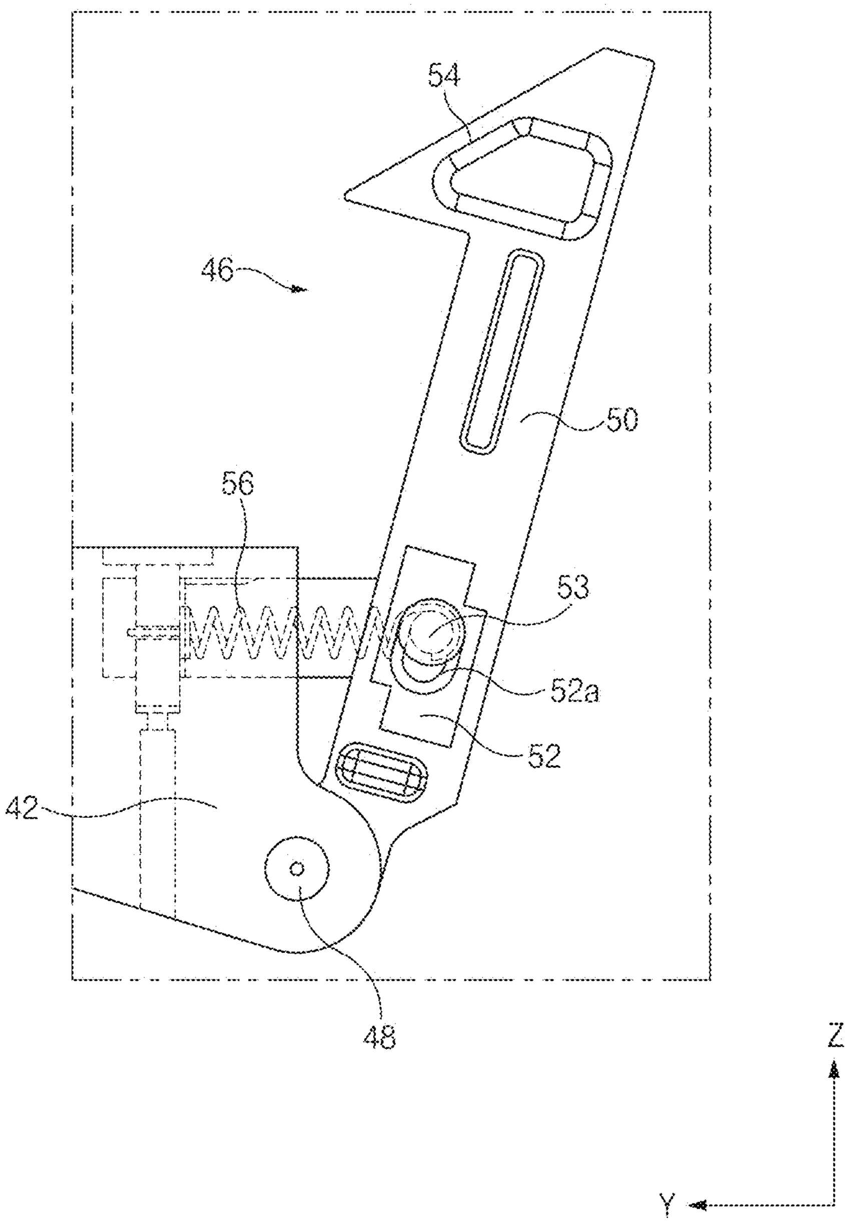
FIG. 8 is an enlarged view of a part of FIG. 7, and an object fixing elastic member is indicated by dotted lines.

FIG. 3 is an exploded perspective view illustrating a part of the support apparatus for storing an object according to an embodiment of the present disclosure. FIG. 4 is a top plan view illustrating a state in which a length adjustment part is adjusted to shorten a distance between a fixing unit and the support frame of the support apparatus for storing an object according to an embodiment of the present disclosure. FIG. 5 is a top plan view illustrating a state in which the length adjustment part is adjusted to lengthen a distance between the fixing unit and the support frame of the support apparatus for storing an object according to an embodiment of the present disclosure. FIGS. 4 and 5 illustrate horizontal cross-sections of the support part of the support frame so that the length adjustment part is visible. FIG. 6 is a front view illustrating a state in which the fixing units of the support apparatus for storing an object according to an embodiment of the present disclosure are retracted toward the support frame. FIG. 7 is a front view illustrating a state in which the fixing units of the support apparatus for storing an object according to an embodiment of the present disclosure are spread to the outside of the support frame. FIG. 8 is an enlarged view of a part of FIG. 7. An object fixing elastic member is indicated by dotted lines in FIG. 8.

With reference to FIGS. 1 to 3, a support apparatus 1 according to an embodiment of the present disclosure may include a coupling unit 60 provided at the upper end of the main rod 20, and the support frame 30 can be movably coupled to the coupling unit 60.

In an embodiment, the support frame 30 may be a frame configured to directly support the waist wearable part W of the wearable robot R. In an embodiment, the support frame 30 may include a support part 32.

In an embodiment, the support part 32 may be configured to have an upper surface 32*a* on which the waist wearable part W of the wearable robot R can be placed. The upper surface 32*a* of the support part 32 may be formed to be flat in the horizontal direction (a direction perpendicular to the Z-axis) so that the object may be stably placed thereon. As necessary/desired, one region of the upper surface 32*a* may be formed to be stepped or curved.

In an embodiment, the support part 32 may have a plate shape extending in the horizontal direction (the direction perpendicular to the Z-axis). Therefore, the wearable robot R may be stably supported in a larger area.

Hereinafter, a specific shape of the support part 32 according to an embodiment will be described. The support part 32 may include a main support portion 34 having a generally quadrangular shape, and a sub-support portion 36 having a generally triangular shape extending outward from the main support portion 34 in the horizontal direction (the direction perpendicular to the Z-axis).

In an embodiment, the sub-support portion 36 may extend in a direction opposite to the wheel 14 with the main rod 20 interposed therebetween. As illustrated, the sub-support portion 36 may extend rearward (in a negative X-axis direction) from the rim portion of the main support portion 34. This configuration may allow the support apparatus 1 to stably have a center of gravity as a whole.

In an embodiment, the sub-support portion 36 may have a shape having a width that decreases toward the end side thereof. As illustrated, the sub-support portion 36 may have a generally triangular shape having one vertex directed rearward (in the negative X-axis direction). The shape of the sub-support portion 36 may be appropriately modified, as necessary/desired.

In an embodiment, an indication portion 32*b* may be provided on the upper surface 32*a* of the support part 32. The indication portion 32*b* may be configured to guide a direction in which the wearable robot R can be moved onto the support part 32. As illustrated, the indication portion 32*b* may have an arrow or wedge shape that indicates the direction. Therefore, the wearable robot R may be accurately placed on the support apparatus 1.

The indication portion 32*b* may be debossed or embossed on the upper surface 32*a* or formed by being marked with ink with a color different from a color of the support part 32, for example. The indication portion 32*b* is not specially limited and preferably the indication portion 32*b* may visually indicate the movement direction of the wearable robot R to the outside.

With reference to FIGS. 3 to 5, length adjustment parts 42 of fixing units 40 to be described below may be coupled to the support part 32 of the support frame 30 according to an embodiment of the present disclosure. The support part 32 may have fixing unit coupling portions 33.

In an embodiment, the fixing unit coupling portion 33 may be provided as a space formed in the main support portion 34 of the support part 32. The fixing unit coupling portion 33 may extend in a leftward/rightward direction (a Y-axis direction). The extension direction of the fixing unit coupling portion 33 may be parallel to a direction in which a length of the length adjustment part 42 can be adjusted.

In an embodiment, the extension direction of the fixing unit coupling portion 33 may be perpendicular to an extension direction of a guide part 38 to be described below. This configuration may minimize a degree to which the movement of the center of gravity of the support part 32 along the guide part 38 and the adjustment of the length of the length adjustment part 42 affect each other.

In an embodiment, one side of the fixing unit coupling portion 33 based on the extension direction thereof may be opened to the outside through a rim of the main support portion 34. Therefore, the length adjustment part 42 may enter and/or exit the inside of the main support portion 34 through the fixing unit coupling portion 33. Therefore, it can be possible to adjust a distance by which one end of the length adjustment part 42, which can be placed outside the fixing unit coupling portion 33, can be spaced apart from the support part 32.

In an embodiment, the fixing unit coupling portions 33 may be provided as a pair of fixing unit coupling portions 33. The pair of fixing unit coupling portions 33 may be disposed in parallel in the leftward/rightward direction (the Y-axis direction). Further, the pair of fixing unit coupling portions 33 may be opened to the outside through left and right rims of the main support portion 34. This configuration may couple the pair of fixing units 40 to the support part 32, as described below.

In an embodiment, the fixing unit coupling portion 33 can be provided as a space provided in the support part 32. However, the structure or shape of the fixing unit coupling portion 33 is not specially limited and preferably the length adjustment part 42 of the fixing unit 40 may be coupled to the fixing unit coupling portion 33, for example. For example, the fixing unit coupling portion 33 may be provided in a guide slot shape extending in the leftward/rightward direction (the Y-axis direction) on a lower surface of the support part 32.

With reference to FIGS. 1 to 3, the support frame 30 of the support apparatus 1 according to an embodiment of the present disclosure may include a guide part 38. The coupling unit 60, which can be provided at the end of the main rod 20, may be slidably coupled to the guide part 38.

Therefore, the center of gravity of the support frame 30 may be moved in the horizontal direction (the direction perpendicular to the Z-axis) by the guide part 38. Therefore, the support apparatus 1 may stably support the wearable robot R having a complicated shape or structure by adjusting the center of gravity accordingly.

In an embodiment, the guide part 38 may be provided on the lower surface of the support part 32. The guide part 38 may extend in the horizontal direction (the direction perpendicular to the Z-axis). The guide part 38 may extend from one end side rim of the support part 32 to the other end side rim opposite to one end side rim of the support part 32 so that the guide part 38 passes through the center of gravity of the support part 32.

As illustrated, the support part 32 may extend from a rear end of the sub-support portion 36 (based on the negative X-axis direction) to a front end side rim of the main support portion 34 (based on the positive X-axis direction) opposite to the rear end of the sub-support portion 36. Therefore, the center of gravity of the support part 32 may be placed on the movement section, which may improve the structural stability of the support apparatus 1.

In an embodiment, guide grooves **38*a* may be formed in the guide part 38, and the coupling unit 60 to be further described below may be slidably coupled to the guide grooves 38*a*. The guide groove 38*a* may extend in parallel with the guide part 38**.

In an embodiment, the guide grooves **38*a* may be provided as a pair of guide grooves 38*a* respectively formed in two opposite side portions of the guide part 38. Therefore, the coupling unit 60 may not be withdrawn in the direction perpendicular to the extension direction of the guide part 38. This configuration will be described below together with a sliding part 62 of the coupling unit 60**.

In an embodiment, sliding fixing holes **38*b* may be formed in the guide part 38. The sliding fixing holes 38*b* may be configured to fix the position of the center of gravity of the support frame 30**.

As described below specifically, a sliding fixing protrusion of the coupling unit 60 may be inserted into the sliding fixing hole **38*b*, such that the relative positions of the guide part 38 and the coupling unit 60 may be fixed. Therefore, the position of the center of gravity of the support frame 30** may be fixed.

In an embodiment, the sliding fixing holes **38*b* may be provided as a plurality of sliding fixing holes 38*b*. The plurality of sliding fixing holes 38*b* may be arranged in the extension direction of the guide part 38. Therefore, the center of gravity of the support frame 30 may be fixed at any position on one section based on the extension direction of the guide part 38**.

In an embodiment, the plurality of sliding fixing holes **38*b* may be formed in the two opposite side portions of the guide part 38. In other words, the plurality of sliding fixing holes 38*b* may be disposed in two rows parallel to each other in the extension direction of the guide part 38. Therefore, the center of gravity of the support frame 30** may be stably fixed.

In an embodiment, the guide part 38 can be provided on the lower surface of the support part 32. However, the position of the guide part 38 is not specially limited and preferably the guide part 38 may guide the movement direction of the support part 32. For example, the guide part 38 may be provided as a pair of guide parts 38 provided on two opposite side portions of the support part 32.

With reference to FIGS. 1 and 4 to 8, the support apparatus 1 according to an embodiment of the present disclosure may include fixing units 40. The fixing units 40 may be configured to fix the wearable robot R to the support frame 30. Therefore, the wearable robot R may be more stably supported and stored by the support apparatus 1.

With reference to FIGS. 1, 4, and 5, in an embodiment, the fixing unit 40 may include the length adjustment part 42. The length adjustment part 42 may be configured to provide a base on which a fixing part 46 of the fixing unit 40 to be described below can be installed. The length adjustment part 42 may have a frame shape extending in the leftward/rightward direction (the Y-axis direction).

In an embodiment, one end of the length adjustment part 42 may be exposed to a side of the support part 32. Therefore, the fixing part 46 to be described below may be coupled to one end of the length adjustment part 42. The fixing parts 46 may be configured to grip the waist wearable part W of the wearable robot R placed on the support part 32.

In an embodiment, as described above, the other end of the length adjustment part 42 may be movably coupled to the fixing unit coupling portion 33 of the support frame 30. The length adjustment part 42 may be coupled to the fixing unit coupling portion 33 so as to be slidable in the leftward/rightward direction (the Y-axis direction).

Therefore, in an embodiment, it can be possible to adjust a distance (or length) by which one end of the length adjustment part 42 is spaced apart from the rim of the support part 32. Therefore, one end of the length adjustment part 42 may be appropriately positioned to correspond to a width in the leftward/rightward direction (the Y-axis direction) of the waist wearable part W placed on the support part 32. This configuration may assist the fixing part 46 in accurately fixing the waist wearable part W.

In an embodiment, the fixing unit 40 may include length restoring elastic members 44 (e.g., springs). The length restoring elastic member 44 may be configured to restore a distance, by which one end of the length adjustment part 42 is spaced apart from the support part 32, to a predetermined length by using an elastic restoring force. The predetermined length may be set by adjusting the structure or properties of the length restoring elastic member 44.

For example, in an embodiment, the length restoring elastic member 44 may be configured to push the length adjustment part 42 into the fixing unit coupling portion 33 as deeply as possible. In other words, the length restoring elastic member 44 may be configured to restore a distance, by which one end of the length adjustment part 42 is spaced apart from the support part 32, to a minimum length.

The length restoring elastic member 44 may be configured as a tensile spring, for example. One side of the length restoring elastic member 44 may be coupled to the length adjustment part 42, and the other side of the length restoring elastic member 44 may be coupled to a central portion of the support part 32. The other side of the length restoring elastic member 44 may be coupled to the support part 32 by a predetermined coupling member 43, such as a screw.

In an embodiment, the length restoring elastic members 44 may be provided as a plurality of length restoring elastic members 44. The plurality of length restoring elastic members 44 may be arranged in a width direction (the X-axis direction) of the length adjustment part 42. Therefore, an elastic restoring force of the length restoring elastic member 44 may be uniformly applied in the width direction of the length adjustment part 42. This configuration may minimize a degree to which the length adjustment part 42 unnecessarily interferes with an inner wall of the fixing unit coupling portion 33 during a process in which the length adjustment part 42 moves.

With reference to FIGS. 1, 3, and 6 to 8, the fixing unit 40 of the support apparatus 1 according to an embodiment of the present disclosure may include the fixing part 46. As described above, in an embodiment, the fixing part 46 may be a unit for fixing the wearable robot R placed on the upper surface 32*a* of the support part 32.

In an embodiment, the fixing part 46 may include a hinge shaft member 48 pivotably or rotatably coupled to one end of the length adjustment part 42, and a fixing part body 50 having a rod shape and extending from the hinge shaft member 48. The fixing part body 50 may extend upward (in the positive Z-axis direction). One end of the length adjustment part 42 may be a portion exposed to a side of the support part 32 based on the leftward/rightward direction (the Y-axis direction).

In an embodiment, the hinge shaft member 48 may be parallel to the guide part 38 of the support frame 30. In other words, the hinge shaft member 48 may extend in the forward/rearward direction (the X-axis direction).

Therefore, the fixing part body 50, which can pivot or rotate about the hinge shaft member 48, may fix the waist wearable part W of the wearable robot R placed on the upper surface 32*a* of the support part 32 while pressing the waist wearable part W in the width direction of the support part 32. A pivot/rotation direction of the fixing part body 50 may be appropriately modified, as necessary/desired.

In an embodiment, the fixing part 46 may include a fixing clamp 54. The fixing clamp 54 may be configured to increase a coupling force (or a fixing force) between the fixing part 46 and the wearable robot R.

In an embodiment, the fixing clamp 54 may be provided at an end of the fixing part body 50. Therefore, the fixing clamp 54 may press and fix the wearable robot R placed on the upper surface 32*a* of the support part 32 while rotating together with the fixing part body 50.

The fixing clamp 54 may have a hook shape by which a predetermined object may be caught. The hook shape of the fixing clamp 54 may protrude toward the central portion of the support part 32. Therefore, an upper portion of the waist wearable part W placed on the support part 32 may be fixed by being caught. The shape of the fixing clamp 54 may be appropriately modified in consideration of a shape or the like of an object placed on the support part 32.

With reference to FIGS. 7 and 8, in an embodiment, the fixing part 46 may include a guide block 52. The guide block 52 may be configured to guide a sliding shaft member 53, which will be described below. The guide block 52 may be provided on the fixing part body 50. The guide block 52 may be positioned between the hinge shaft member 48 and the fixing clamp 54.

As illustrated, the guide block 52 may be provided as a member provided separately from the fixing part body 50 and may be coupled to the fixing part body 50. Alternatively, the guide block 52 may be integrated with the fixing part body 50.

In an embodiment, a guide hole 52*a* may be formed in the guide block 52. The sliding shaft member 53 may be slidably coupled to the guide hole 52*a*. The guide hole 52*a* may extend in parallel with the fixing part body 50. The guide hole 52*a* is not specially limited and preferably the guide hole 52*a* may guide a direction in which a predetermined object slides, for example. For example, the guide hole 52*a* may be changed to an elongated groove, slit, or the like.

In an embodiment, the fixing unit 40 may include the sliding shaft member 53 and an object fixing elastic member 56. The sliding shaft member 53 may be slidably coupled to the guide hole 52*a* of the guide block 52. One side of the object fixing elastic member 56 may be fixed to the sliding shaft member 53.

In an embodiment, the object fixing elastic member 56 may be configured to press the fixing part body 50 of the fixing part 46 toward the length adjustment part 42. In other words, the object fixing elastic member 56 may apply an elastic force to the fixing part body 50 so that the fixing part body 50 pivots/rotates toward a center of the support part 32. Therefore, the fixing part 46 may fix the waist wearable part W placed on the support part 32, while pressing the waist wearable part W with a predetermined force.

In an embodiment, the object fixing elastic member 56 may be configured as a tensile spring having one side fixed to the sliding shaft member 53 and the other side fixed to one end of the length adjustment part 42.

Because one side of the object fixing elastic member 56 can be fixed to the sliding shaft member 53, the object fixing elastic member 56 may move along the guide hole 52*a* together with the sliding shaft member 53.

Therefore, a phase of the object fixing elastic member 56 may be adjusted so that the elastic force applied to the fixing part body 50 is applied as horizontally as possible. The object fixing elastic member 56 may be disposed in a predetermined cylindrical member and protected from external contamination or impact.

With reference to FIG. 1, the fixing units 40 of the support apparatus 1 according to an embodiment of the present disclosure may be configured as a pair of the fixing units 40. The pair of fixing units 40 may be respectively positioned on two opposite side portions of the support frame 30 based on the leftward/rightward direction (the Y-axis direction). Therefore, the waist wearable part W, which can be pressed by the pair of fixing units 40, may be stably fixed to the support frame 30.

Hereinafter, the coupling unit configured to move the center of gravity of the support frame in the horizontal direction in an embodiment of the present disclosure will be described specifically.

Figure 9:
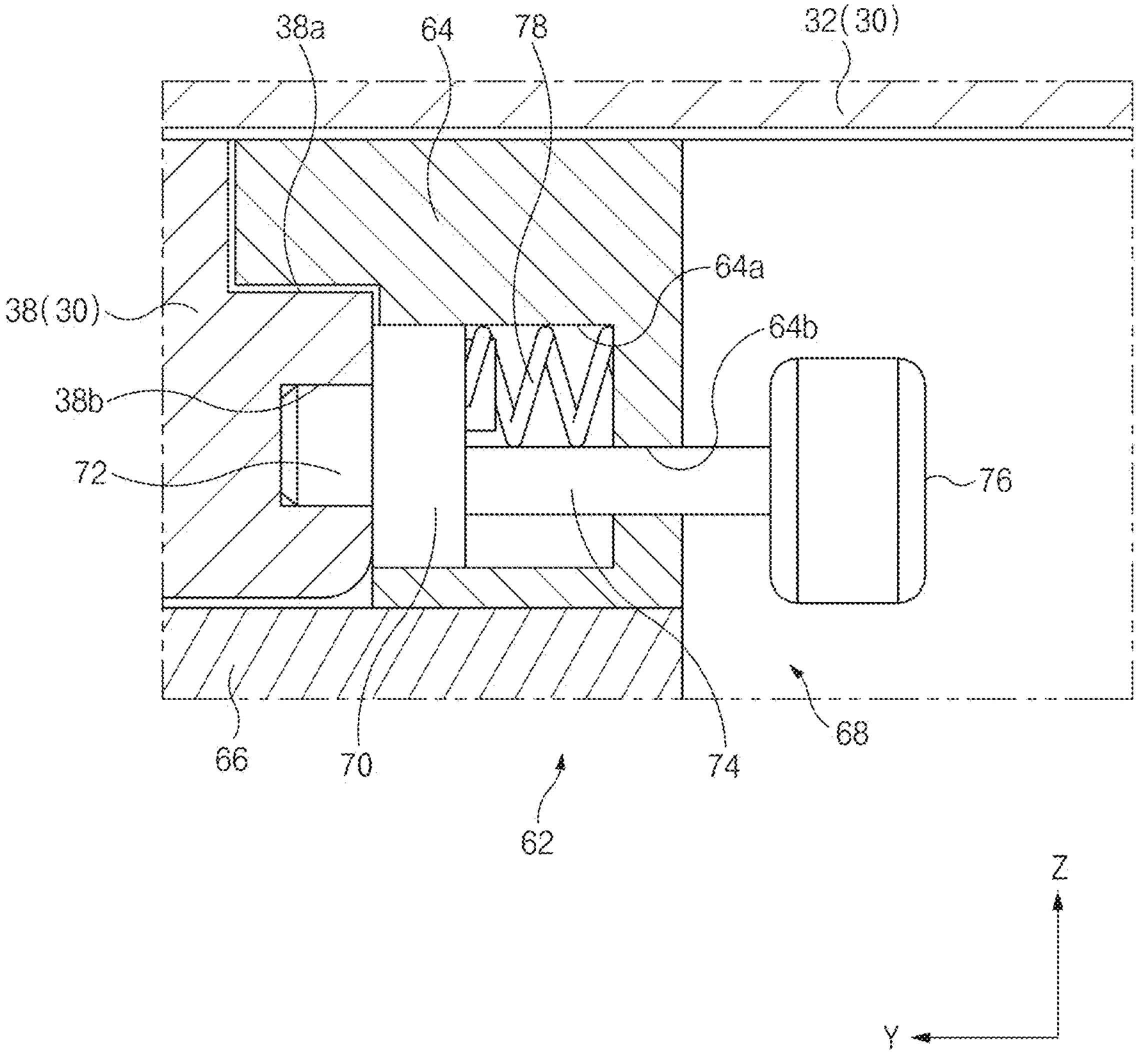
FIG. 9 is a sectional view for explaining a state in which relative positions of a guide part and a sliding part of a support apparatus for storing an object according to an embodiment of the present disclosure are fixed by a sliding fixing part.
Figure 10:
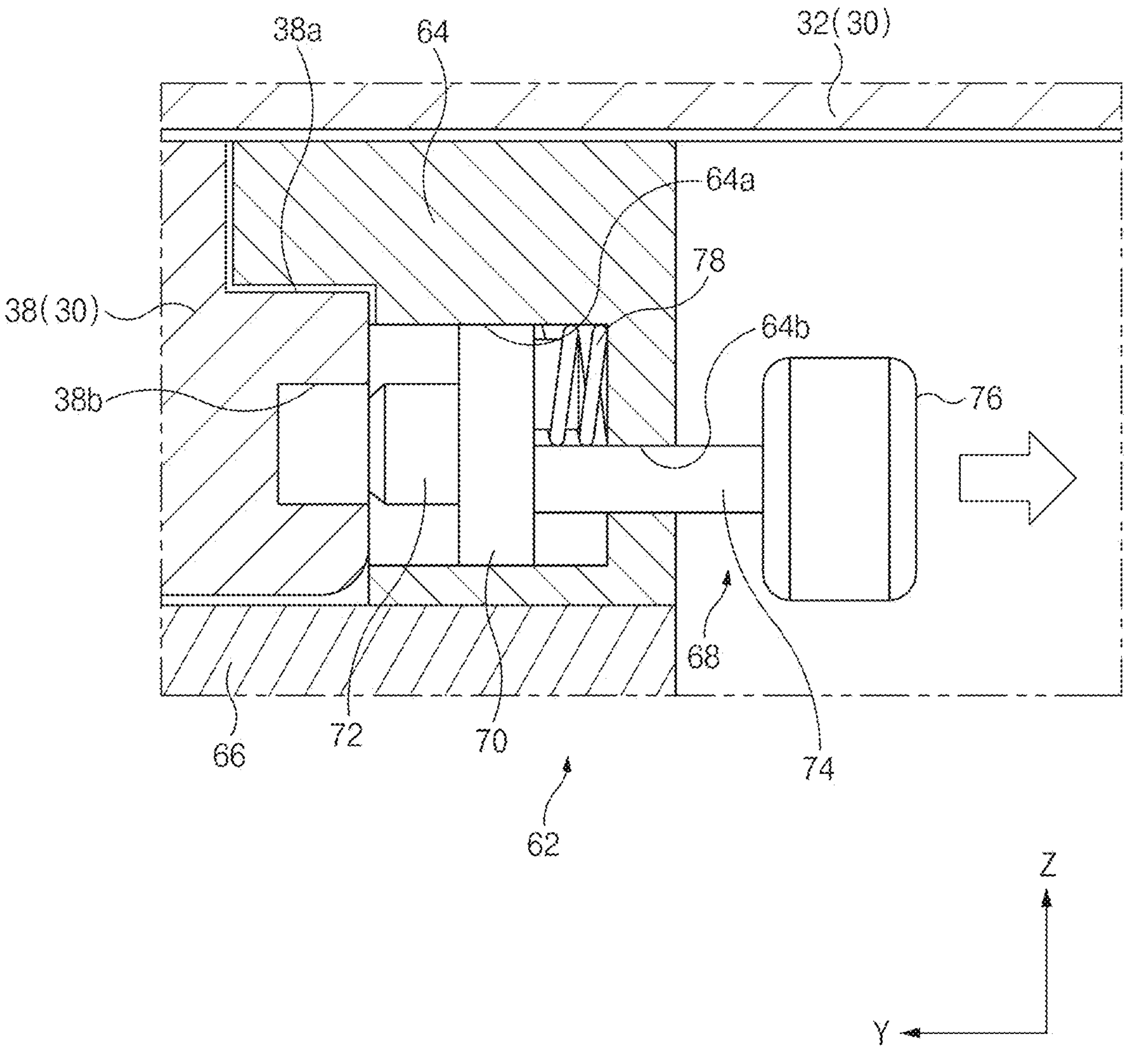
FIG. 10 is a sectional view for explaining a state in which relative positions of a guide part and a sliding part of a support apparatus for storing an object according to an embodiment of the present disclosure are not fixed.
Figure 11:
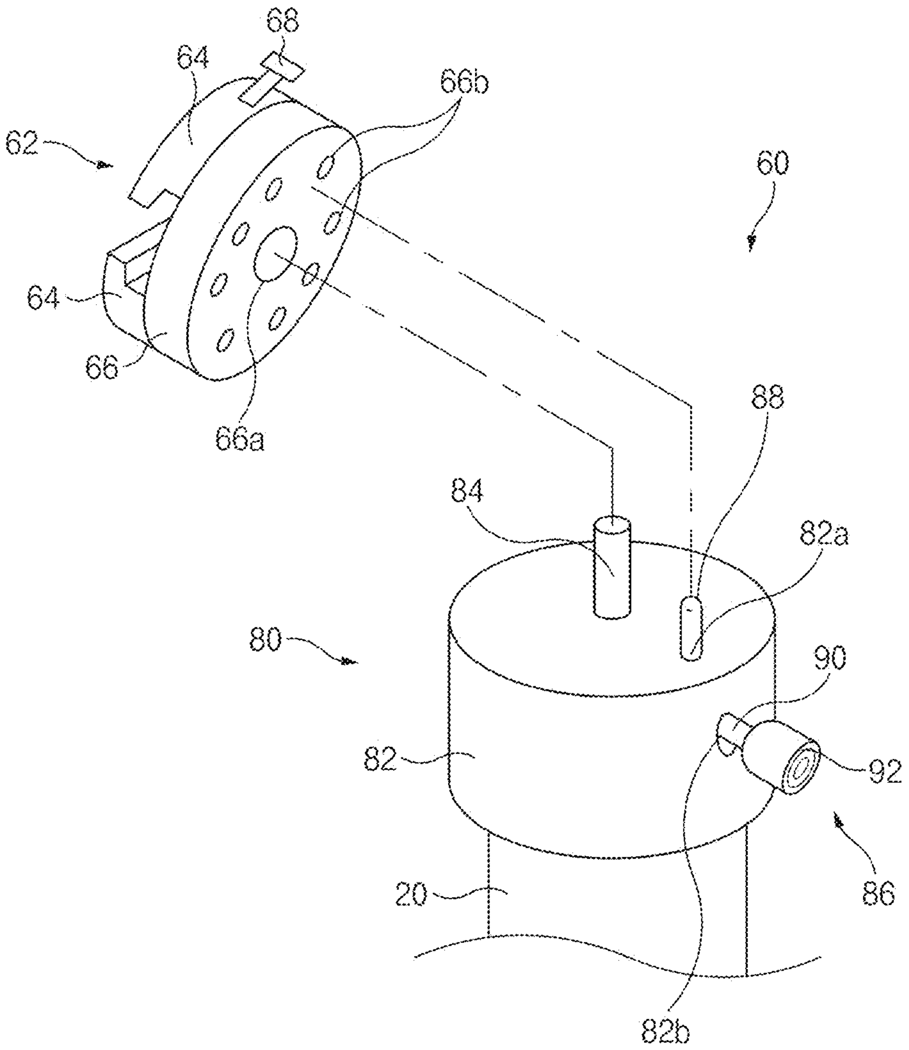
FIG. 11 is an exploded perspective view illustrating a coupling unit of a support apparatus for storing an object according to an embodiment of the present disclosure.
Figure 12:
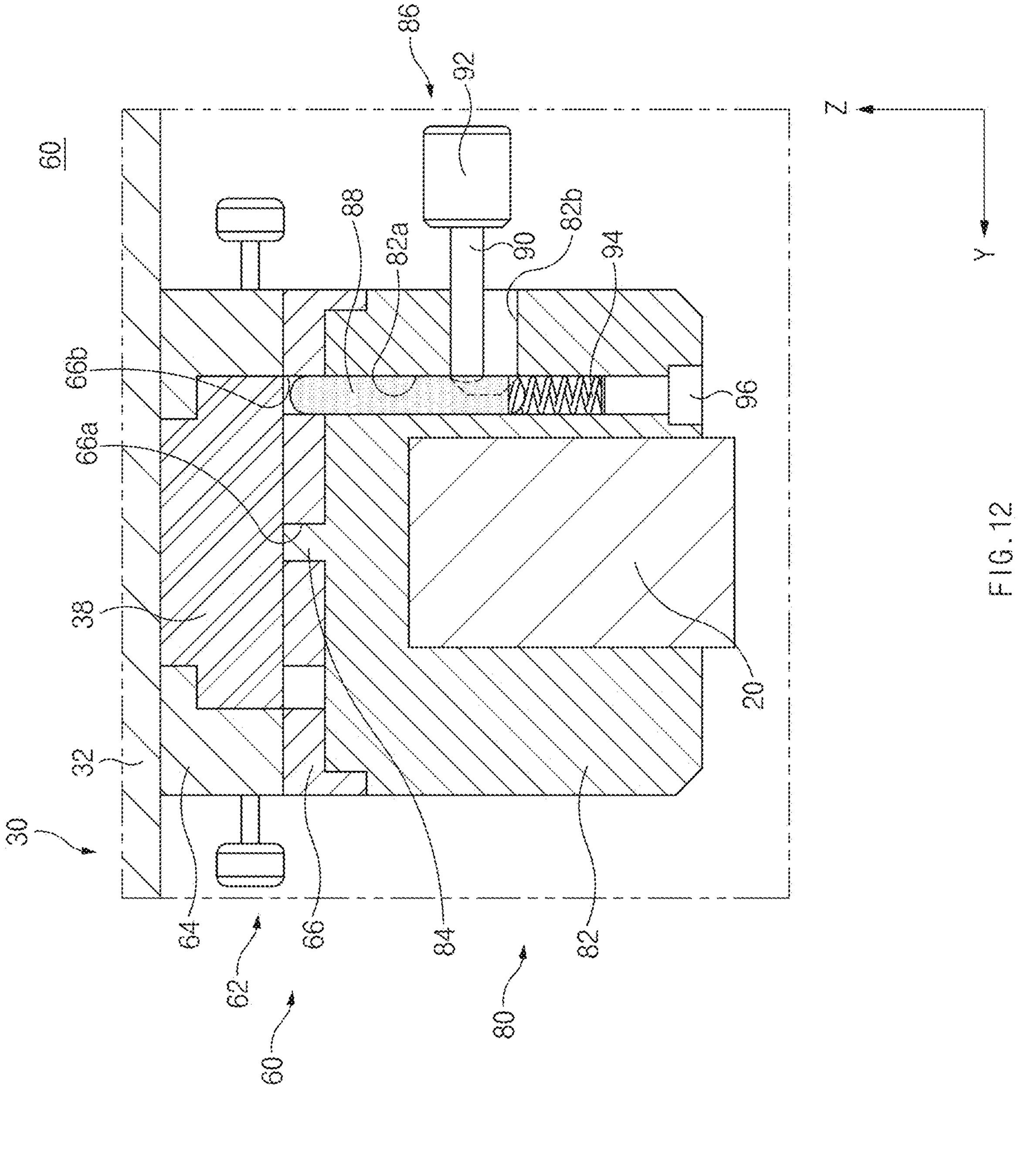
FIG. 12 is a sectional view for explaining a state in which relative positions of a sliding part and a rotation base part of a support apparatus for storing an object according to an embodiment of the present disclosure are fixed by a rotation fixing part.
Figure 13:
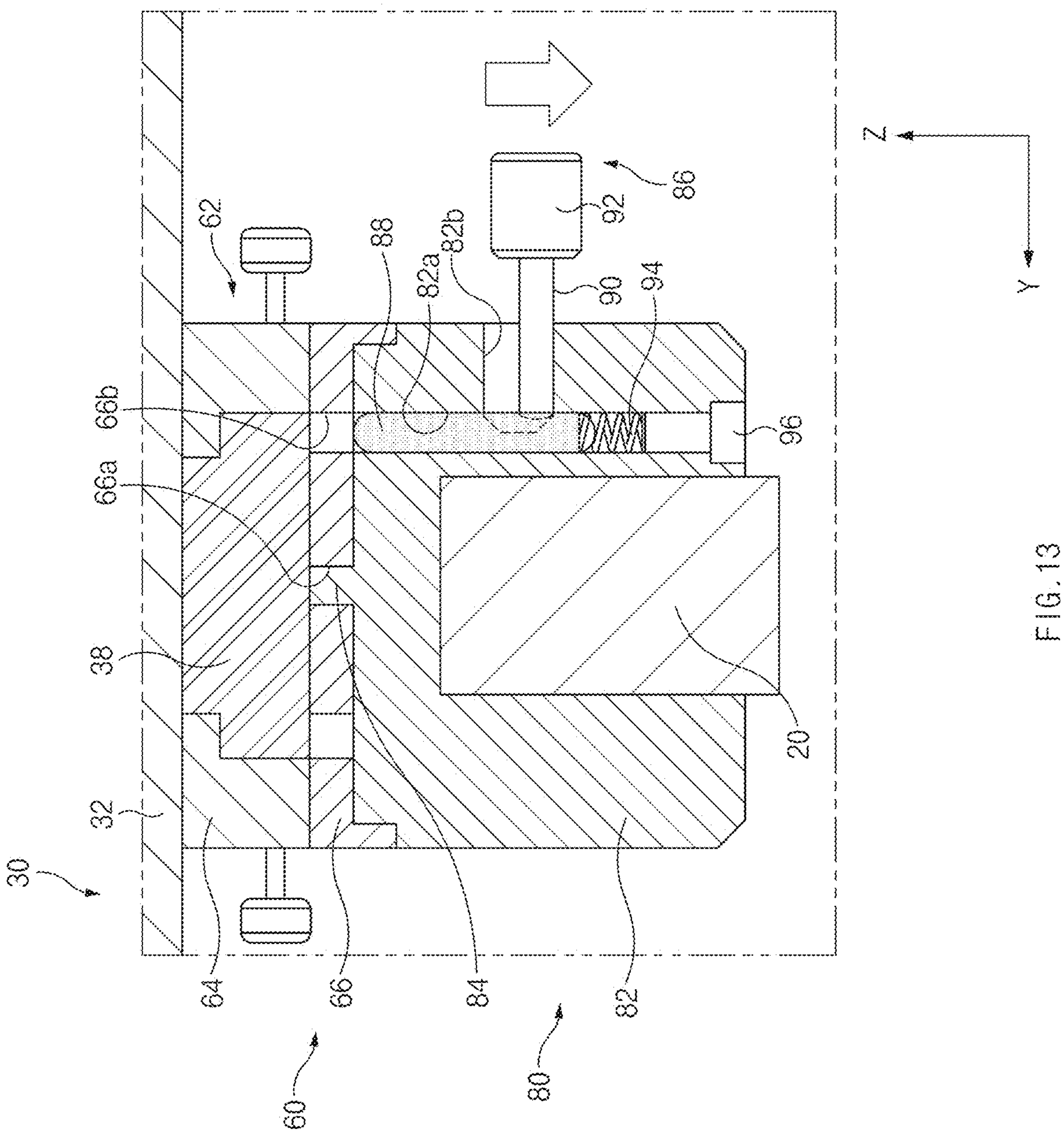
FIG. 13 is a sectional view for explaining a state in which relative positions of a sliding part and a rotation base part of a support apparatus for storing an object according to an embodiment of the present disclosure are not fixed.

FIG. 9 is a cross-section view for explaining a state in which the relative positions of the guide part and the sliding part of the support apparatus for storing an object according to an embodiment of the present disclosure can be fixed by the sliding fixing part. FIG. 10 is a cross-section view for explaining a state in which the relative positions of the guide part and the sliding part of the support apparatus for storing an object according to an embodiment of the present disclosure can be not fixed. FIGS. 9 and 10 illustrate vertical cross-sections of the support frame and the sliding part so that an interior of the support frame and an interior of the sliding part are visible. FIG. 11 is an exploded perspective view illustrating the coupling unit of the support apparatus for storing an object according to an embodiment of the present disclosure. FIG. 12 is a cross-section view for explaining a state in which the relative positions of the sliding part and a rotation base part of the support apparatus for storing an object according to an embodiment of the present disclosure can be fixed by a rotation fixing part. FIG. 13 is a cross-section view for explaining a state in which the relative positions of the sliding part and the rotation base part of the support apparatus for storing an object according to an embodiment of the present disclosure can be not fixed. FIGS. 12 and 13 illustrate vertical cross-sections of the sliding part and the rotation base part so that the interior of the sliding part and the interior of the rotation base part are visible.

With reference to FIGS. 1 to 3, 9, and 10, the coupling unit 60 of the support apparatus 1 according to an embodiment of the present disclosure may include the sliding part 62. The sliding part 62 may be supported by the upper end of the main rod 20. The sliding part 62 may be slidably coupled to the guide part 38 of the support frame 30. Therefore, the center of gravity of the support frame 30 may be moved in the forward/rearward direction (the X-axis direction) relative to the main rod 20.

In an embodiment, the sliding part 62 may include a sliding block 64. The sliding block 64 may be a block with a shape configured to slidably fit with the guide groove 38*a* of the guide part 38.

In an embodiment, the sliding block 64 may be provided as a pair of sliding blocks 64 respectively coupled to two opposite sides of the guide part 38. The pair of sliding blocks 64 may be connected by a sliding plate 66, as will be described below. Therefore, the pair of sliding blocks 64 may define a single rigid body. This configuration may prevent the sliding block 64 from being withdrawn from the guide part 38.

In an embodiment, the sliding block 64 may have a sliding fixing body coupling portion 64*a*. A sliding fixing body 70 to be described below may be movably coupled to the sliding fixing body coupling portion 64*a*.

As illustrated, the sliding fixing body coupling portion 64*a* may be provided as a space provided in the sliding block 64. The sliding fixing body coupling portion 64*a* may extend in an outward direction of the guide part 38. Therefore, the sliding fixing body 70 may move in the sliding fixing body coupling portion 64*a* in a direction in which the sliding fixing body 70 moves toward or away from the guide part 38.

In an embodiment, one side of the sliding fixing body coupling portion 64*a* may be opened. One side of the sliding fixing body coupling portion 64*a* may be opened in a direction toward the side portions of the guide part 38 in which the sliding fixing holes 38*b* are arranged.

Therefore, the sliding fixing body coupling portion 64*a* and the sliding fixing hole 38*b* may communicate with each other in accordance with the relative positions of the sliding block 64 and the guide part 38. In other words, when the sliding fixing hole 38*b* and the sliding fixing body coupling portion 64*a* overlap each other in the width direction (the Y-axis direction) of the guide part 38, the sliding fixing hole 38*b* and the sliding fixing body coupling portion 64*a* may communicate with each other.

The sliding fixing body coupling portion 64*a* is not specially limited and preferably the sliding fixing body 70 to be described below may be movably coupled to the sliding fixing body coupling portion 64*a*, for example. For example, the sliding fixing body coupling portion 64*a* may be provided in the form of a guide slit or a guide groove.

In an embodiment, the sliding block 64 may have a sliding fixing rod through-hole 64*b*. The sliding fixing rod through-hole 64*b* may be a hole into which a sliding fixing rod 74 to be described below can be penetratively coupled.

The sliding fixing rod through-hole 64*b* may extend in an outward direction of the guide block 64 from the sliding fixing body coupling portion 64*a*. One opening of the sliding fixing rod through-hole 64*b* may be provided in an outer surface of the guide block 64.

In an embodiment, the coupling unit 60 may include a sliding fixing part 68. The sliding fixing part 68 may be configured to fix the relative positions of the sliding part 62 and the guide part 38.

Therefore, with an embodiment, the user may stably store the wearable robot R by placing the center of gravity of the support frame 30 at an appropriate position and then fixing the position of the support frame 30 by using the sliding fixing part 68 so that the wearable robot R is stably supported.

In an embodiment, the sliding fixing part 68 may include the sliding fixing body 70. The sliding fixing body 70 may be slidably coupled to the sliding fixing body coupling portion 64*a* of the sliding block 64. Therefore, the sliding fixing body 70 may move in the sliding fixing body coupling portion 64*a* in a direction in which the sliding fixing body 70 moves toward or away from the guide part 38.

In an embodiment, the sliding fixing part 68 may include a sliding fixing protrusion 72. The sliding fixing protrusion 72 may protrude from the sliding fixing body 70 toward the guide part 38.

In an embodiment, the sliding fixing protrusion 72 may be selectively inserted into any one of a plurality of sliding fixing holes 68*b*, thereby fixing the relative positions of the guide part 38 and the sliding part 62.

Specifically, when the sliding fixing body 70 moves toward the guide part 38, the sliding fixing protrusion 72 may protrude to the outside of the sliding block 64 through one open side of the sliding fixing body coupling portion 64*a*.

The sliding fixing protrusion 72, which protrudes to the outside of the sliding block 64, may be inserted into the sliding fixing hole 38*b* that faces one open side of the sliding fixing body coupling portion 64*a*. Therefore, the sliding part 62 and the guide part 38 may be fixed, and the position of the center of gravity of the support frame 30 may also be fixed.

On the contrary, when the sliding fixing body 70 moves in the direction in which the sliding fixing body 70 moves away from the guide part 38, the sliding fixing protrusion 72 may be withdrawn from the sliding fixing hole 38*b*. Therefore, the positions of the sliding part 62 and the guide part 38 may be unfixed, and the sliding part 62 may move along the guide part 38. Therefore, the center of gravity of the support frame 30 may be moved in the horizontal direction again.

In an embodiment, the sliding fixing part 68 may include the sliding fixing rod 74. The sliding fixing rod 74 may extend from the sliding fixing body 70 to the outside of the sliding block 64. To this end, the sliding fixing rod 74 may penetrate the sliding fixing rod through-hole 64*b*.

In an embodiment, the sliding fixing part 68 may include a sliding fixing handle 76. The sliding fixing handle 76 may be provided at an end of the sliding fixing rod 74. The sliding fixing handle 76 may have a shape that allows the user, who uses the support apparatus 1, to easily grip the sliding fixing handle 76.

The user may control the position of the sliding fixing body 70 by pushing the sliding fixing handle 76 toward the guide part 38 or pulling the sliding fixing handle 76 to the outside of the guide part 38. Therefore, the user may fix or unfix the relative positions of the sliding part 62 and the guide part 38.

In an embodiment, the sliding fixing part 68 may include a sliding fixing elastic member 78. The sliding fixing elastic member 78 may be configured to press the sliding fixing body 70 toward the guide part 38.

This configuration may allow the sliding fixing part 68 to operate to fix the relative positions of the sliding part 62 and the guide part 38 in a normal state in which no external force is applied to the sliding fixing part 68. The external force may be an operating force applied by the user's muscular strength transmitted to the sliding fixing body 70 through the sliding fixing handle 76.

In an embodiment, the sliding fixing elastic member 78 may be a compression spring. One side of the sliding fixing elastic member 78, which is close to the guide part 38, may be coupled to the sliding fixing body 70. The other side of the sliding fixing elastic member 78, which is positioned to be distant from the guide part 38, may be supported on or coupled to an inner wall of the sliding fixing body coupling portion 64*a*.

Therefore, in the state in which no external force is applied, the sliding fixing elastic member 78 may press the sliding fixing body 70 toward the guide part 38 and then insert the sliding fixing protrusion 72 into the sliding fixing hole 38*b*. Meanwhile, the structure or type of the sliding fixing elastic member 78 is not specially limited and preferably the sliding fixing elastic member 78 may press the sliding fixing body 70 toward the guide part 38.

With reference to FIGS. 3 and 11, the sliding part 62 of the support apparatus 1 according to an embodiment of the present disclosure may include the sliding plate 66. The sliding plate 66 may be positioned below the guide part 38 (based on the negative Z-axis direction). The sliding plate 66 may be coupled to the pair of guide blocks 64.

In an embodiment, a center shaft member coupling hole 66*a* may be formed in a lower surface of the sliding plate 66. The center shaft member coupling hole 66*a* may be a hole into which a center shaft member 84 of a rotation base part 80 to be described below is rotatably coupled.

In an embodiment, a plurality of rotation fixing holes 66*b* may be formed in the lower surface of the sliding plate 66. The plurality of rotation fixing holes 66*b* may be arranged in a radial direction based on the main rod 20. In other words, the plurality of rotation fixing holes 66*b* may be placed on an imaginary circular trajectory that surrounds the main rod 20. The function of the rotation fixing hole 66*b* will be described below together with the rotation base part 80.

In an embodiment, the sliding plate 66 and the pair of guide blocks 64 may be provided as separate members and then coupled to each other. However, as necessary/desired, the sliding plate 66 and the pair of guide blocks 64 may be integrated.

With reference to FIGS. 3 and 11 to 13, the coupling unit 60 of the support apparatus 1 according to an embodiment of the present disclosure may include the rotation base part 80. The rotation base part 80 may be provided at the upper end of the main rod 20. The rotation base part 80 may support the sliding part 62 so that the sliding part 62 is rotatable.

Therefore, the support frame 30 coupled to the sliding part 62 may rotate relative to the main rod 20. Therefore, the direction of the wearable robot supported and stored on the support frame 30 may be appropriately changed.

In an embodiment, the rotation base part 80 may include a rotation base body 82. The rotation base body 82 may be provided as a cylindrical member fixedly coupled to the upper end of the main rod 20. An upper surface of the rotation base body 82 may support the sliding plate 66 of the sliding part 62 so that the sliding plate 66 is rotatable.

In an embodiment, the rotation base body 82 may have a rotation fixing body coupling portion 82*a* to which a rotation fixing body 88 to be described below can be movably coupled.

As illustrated, the rotation fixing body coupling portion 82*a* may be provided as a space provided in the rotation base body 82. The rotation fixing body coupling portion 82*a* may extend in an upward/downward direction (the Z-axis direction). Therefore, the rotation fixing body 88 may move in the rotation fixing body coupling portion 82*a* in a direction in which the rotation fixing body 88 moves toward or away from the sliding plate 66 of the sliding part 62.

In an embodiment, one side of the rotation fixing body coupling portion 82*a* may be opened. One open side of the rotation fixing body coupling portion 82*a* may be positioned on an upper surface of the rotation fixing body 88. One side of the rotation fixing body coupling portion 82*a* may be positioned on the lower surface of the sliding plate 66 and face the portion where the plurality of rotation fixing holes 66*b* are arranged.

Therefore, the rotation fixing hole 66*b* and the rotation fixing body coupling portion 82*a* may communicate with each other in accordance with the relative positions of the sliding plate 66 of the sliding part 62 and the rotation base body 88. In other words, when the rotation fixing hole 66*b* and the rotation fixing body coupling portion 82*a* overlap each other in the upward/downward direction (the Z-axis direction), the rotation fixing hole 66*b* and the rotation fixing body coupling portion 82*a* may communicate with each other.

The structure or shape of the rotation fixing body coupling portion 82*a* is not specially limited and preferably the rotation base body 88 may be movably coupled to the rotation fixing body coupling portion 82*a*, for example. For example, the rotation fixing body coupling portion 82*a* may be provided in the form of a guide slit or a guide groove.

In an embodiment, the rotation base body 82 may have a rotation fixing rod through-hole 82*b*. The rotation fixing rod through-hole 82*b* may be a hole into which a rotation fixing rod 90 to be described below is penetratively coupled.

The rotation fixing rod through-hole 82*b* may extend in an outward direction of the rotation base body 82 from the rotation fixing body coupling portion 82*a*. In other words, the rotation fixing rod through-hole 82*b* may extend in the radial direction of the main rod 20. One opening of the rotation fixing rod through-hole 82*b* may be provided in an outer peripheral surface of the rotation base body 82.

With reference to FIG. 11, the rotation base part 80 of the support apparatus 1 according to the embodiment of the present disclosure may include the center shaft member 84. The center shaft member 84 may be configured as a rotation center between the sliding part 62 and the rotation base part 80.

In an embodiment, the center shaft member 84 may extend upward from the upper surface of the rotation base body 82. The center shaft member 84 may be rotatably coupled to the center shaft member coupling hole 66*a* of the sliding plate 66.

With reference to FIGS. 1 to 3 and 11 to 13, the coupling unit 60 of the support apparatus 1 according to an embodiment of the present disclosure may include a rotation fixing part 86. The rotation fixing part 86 may be configured to restrict a relative rotation between the sliding part 62 and the rotation base part 80.

Therefore, with an embodiment, the user may stably store the wearable robot R by appropriately adjusting the direction of the wearable robot R placed on the support frame 30 and then restricting the rotation of the support frame 30 by using the rotation fixing part 86.

In an embodiment, the rotation fixing part 86 may include the rotation fixing body 88. The rotation fixing body 88 may be a rod-shaped member slidably coupled to the rotation fixing body coupling portion 82*a* of the rotation base body 82. Therefore, the rotation fixing body 88 may move in the rotation fixing body coupling portion 82*a* in the upward/downward direction (the Z-axis direction) so that the rotation fixing body 88 moves toward or away from the sliding plate 66 of the sliding part 62.

In an embodiment, one end of the rotation fixing body 88 may be selectively inserted into any one of the plurality of rotation fixing holes 66*b*, thereby fixing the relative rotation between the sliding part 62 and the rotation base part 80.

Specifically, when the rotation fixing body 88 moves upward (in the positive Z-axis direction) toward the sliding part 62, the upper end of the rotation fixing body 88 may protrude toward the upper side of the rotation fixing body 88 through one open side of the rotation fixing body coupling portion 82*a*.

The upper end of the rotation fixing body 88, which protrudes toward the upper side of the rotation fixing body 88, may be inserted into the rotation fixing hole 66*b* that faces one open side of the rotation fixing body coupling portion 82*a*. Therefore, the sliding part 62 and the rotation base part 80 may be fixed to each other, and the support frame 30 may also be fixed so as not to rotate relative to the rotation base part 80.

On the contrary, when the rotation fixing body 88 moves downward (in the negative Z-axis direction) away from the sliding part 62, the upper end of the rotation fixing body 88 may be withdrawn from the rotation fixing hole 66*b*. Therefore, the relative rotation between the sliding part 62 and the rotation base part 80 may be unrestricted, and the support frame 30 may rotate relative to the rotation base part 80 and the main rod 20.

In an embodiment, the rotation fixing part 86 may include the rotation fixing rod 90. The rotation fixing rod 90 may extend to the outside of the rotation base body 82 from a lateral portion of the rotation fixing body 88. To this end, the rotation fixing rod 90 may penetrate the rotation fixing rod through-hole 82*b*.

In an embodiment, the rotation fixing part 86 may include a rotation fixing handle 92. The rotation fixing handle 92 may be provided at an end of the rotation fixing rod 90. The rotation fixing handle 92 may have a shape that allows the user, who uses the support apparatus 1, to easily grip the rotation fixing handle 92.

The user may control the position of the rotation fixing body 88 by pushing or pulling the rotation fixing handle 92 in the upward/downward direction (the Z-axis direction). Therefore, the user may restrict or allow the relative rotation between the sliding part 62 and the rotation base part 80.

In an embodiment, the rotation fixing part 86 may include a rotation fixing elastic member 94. The rotation fixing elastic member 94 may be configured to press the rotation fixing body 88 toward the sliding part 62.

This configuration may allow the rotation fixing part 86 to operate to limit (or restrict) the relative rotation between the rotation base part 80 and the sliding part 62 in the normal state in which no external force is applied to the rotation fixing body 88. The external force may be an operating force applied by the user's muscular strength transmitted to the rotation fixing body 88 through the rotation fixing handle 92.

In an embodiment, the rotation fixing elastic member 94 may be a compression spring. An upper portion of the rotation fixing elastic member 94 may be coupled to a lower portion of the rotation fixing body 88. A lower portion of the rotation fixing elastic member 94 may be supported by the rotation base body 82.

A fixing closure 96, which is fixedly coupled to the rotation base body 82, may be provided in the rotation fixing body coupling portion 82*a* and provided below the rotation fixing elastic member 94. Further, the lower portion of the rotation fixing elastic member 94 may be coupled to the fixing closure 96.

Therefore, in the state in which no external force is applied, the rotation fixing elastic member 94 may press the rotation fixing body 88 toward the sliding part 62 and then insert the upper end of the rotation fixing body 88 into the rotation fixing hole 66*b*. The structure or type of the rotation fixing elastic member 94 is not specially limited and preferably the rotation fixing elastic member 94 may press the rotation fixing body 88 toward the sliding part 62.

With reference to FIG. 1, as described above, the support apparatus 1 according to the embodiment of the present disclosure may be configured such that the center of gravity of the support frame 30 for supporting the wearable robot R is movable in the horizontal direction (the Z-axis direction). Therefore, with an embodiment, the support apparatus 1 may stably support and store the wearable robot R having the changeable center of gravity.

In the support apparatus 1 according to an embodiment of the present disclosure, the support frame 30 may rotate relative to the main rod 20, such that the direction of the wearable robot R placed on the support frame 30 may be appropriately controlled. Therefore, it can be possible to improve the convenience for the user.

Figure 14:
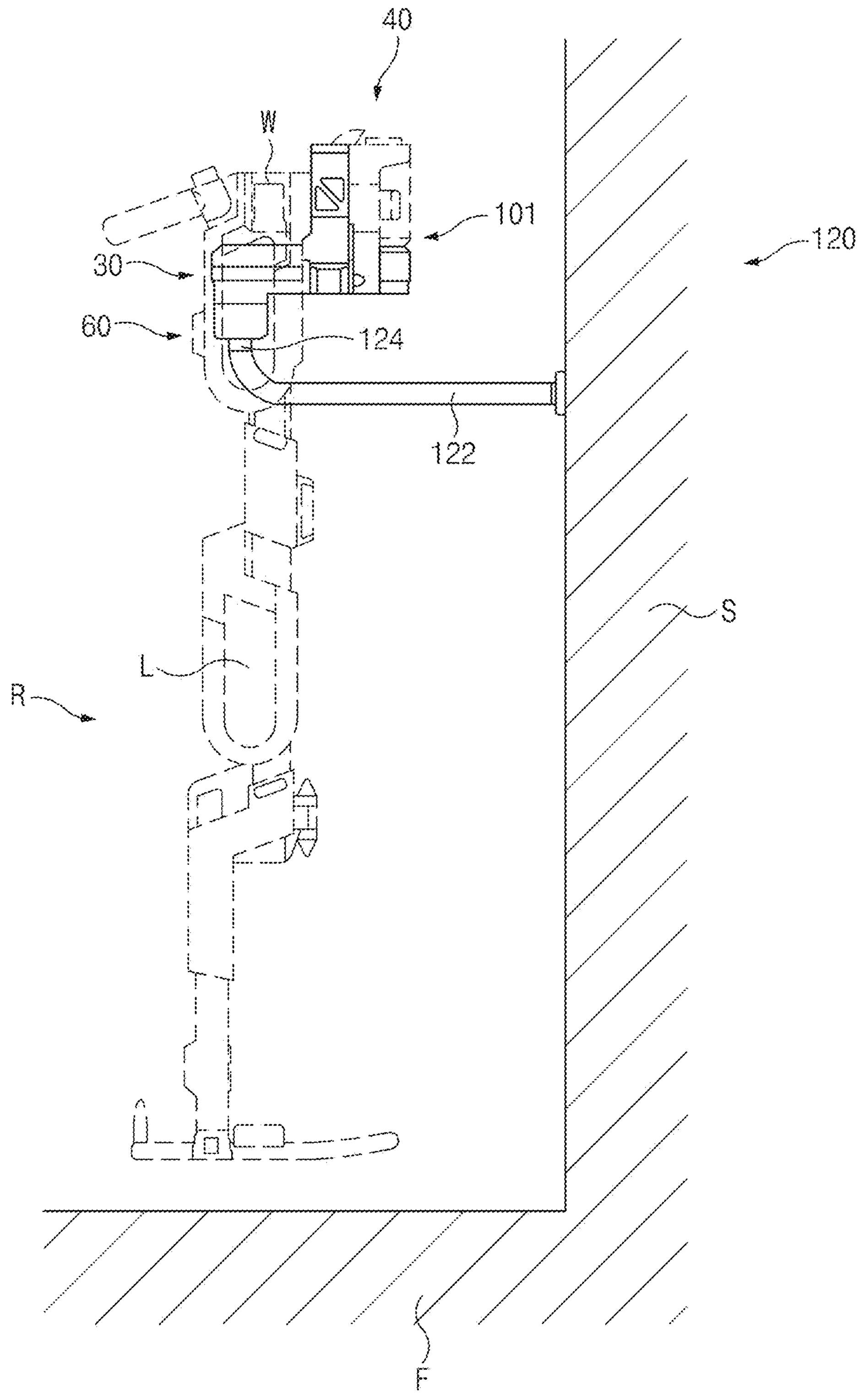
FIG. 14 is a perspective view illustrating a state in which a robot is stored by being supported by a support apparatus for storing an object according to an embodiment of the present disclosure when viewed from above.

FIG. 14 is a perspective view illustrating a state in which a robot is stored by being supported by a support apparatus for storing an object according to an embodiment of the present disclosure when viewed from above. The robot is indicated by dotted lines, and components projected by the robot are indicated by solid lines. The components denoted by reference numerals identical to the reference numerals illustrated in the aforementioned drawings may be understood as the same components having the same structures and functions.

Hereinafter, the description of the support apparatus according to another embodiment of the present disclosure will be focused on the constituent elements different from those of the support apparatus according to the above-mentioned embodiment of the present disclosure. In the support apparatus according to another embodiment of the present disclosure, the other constituent elements, other than the constituent elements to be described below, may be configured to be identical to the corresponding constituent elements of the support apparatus according to the above-mentioned embodiment of the present disclosure. Therefore, the description of the other constituent elements is replaced with the above-mentioned description.

FIG. 14 illustrates a support apparatus 101 according to another embodiment of the present disclosure. With reference to FIG. 14, a main rod 120 of the support apparatus 101 according to another embodiment of the present disclosure may include a first rod part 122 extending from a wall surface S, and a second rod part 124 extending upward (in the positive Z-axis direction) from the first rod part 122.

In an embodiment, the coupling unit 60 may be provided at an upper end of the second rod part 124. The support frame 30 may be coupled to the coupling unit 60 and configured to be slidable in the horizontal direction. The waist wearable part W of the wearable robot R may be supported on the upper surface of the support frame 30.

Therefore, the support apparatus 101 may stably support the wearable robot R by means of a supporting force of the wall surface S. The positions of the centers of gravity of the support frame 30 and the wearable robot R may be appropriately adjusted by the sliding movements of the support frame 30 and the coupling unit 60.

In the above-mentioned embodiment, the object supported and stored by the support apparatus has been described as a wearable robot. However, the support apparatus according to an embodiment of the present disclosure may be used to support and store various types of objects having various structures or shapes in addition to the wearable robot.

In the present disclosure, the plate shape may be understood as including not only a flat plate shape with a constant thickness, but also a curved plate shape having one region and another region with different thicknesses or a curved plate shape having a thickness that gradually changes.

The present disclosure has been described with reference to the example embodiments and the drawings, but the present disclosure is not necessarily limited thereby. Embodiments of the present disclosure may be carried out in various forms by those skilled in the art, to which the present disclosure pertains, within the technical spirit of the present disclosure and the scopes equivalent to the appended claims.

What is claimed is:

1. A support apparatus for storing an object, the support apparatus comprising:
- a main rod configured to be supported by a floor or wall surface;
- a coupling unit at an end of the main rod; and
- a support frame supported by the main rod and movably coupled to the coupling unit in a configuration so that a first center of gravity of the support apparatus storing the object is movable, wherein the support frame comprises:
  - a support part having an upper surface configured to receive the object, wherein the support part has a plate shape; and
  - a guide part extending from one side of the support part in a horizontal direction and configured such that the coupling unit is slidably coupled to the guide part, wherein the guide part is on a lower surface of the support part.

2. The apparatus of claim 1, wherein the guide part extends from a first end of the support part to a second end opposite to the first end of the support part so that the guide part passes through a second center of gravity of the support part.

3. The apparatus of claim 1, wherein the coupling unit comprises:
- a first sliding part coupled to the guide part and configured to be slidable in a first direction; and
- a sliding fixing part coupled to the first sliding part with a configuration so as to be movable toward the guide part and configured to fix relative positions of the first sliding part and the guide part.

4. A support apparatus for storing an object, the support apparatus comprising:
- a main rod configured to be supported by a floor or wall surface;
- a coupling unit at an end of the main rod; and
- a support frame supported by the main rod and movably coupled to the coupling unit in a configuration so that a first center of gravity of the support apparatus storing the object is movable, wherein the support frame comprises:
- a support part having an upper surface configured to receive the object, and
- a guide part extending from one side of the support part in a horizontal direction and configured such that the coupling unit is slidably coupled to the guide part,
- wherein the coupling unit comprises:
  - a first sliding part coupled to the guide part and configured to be slidable in a first direction; and
  - a sliding fixing part coupled to the first sliding part with a configuration so as to be movable toward the guide part and configured to fix relative positions of the first sliding part and the guide part,
  - wherein a plurality of sliding fixing holes are in the guide part and arranged in the first direction, and wherein the sliding fixing part comprises:
  - a sliding fixing body movably coupled to the first sliding part; and
  - a sliding fixing protrusion extending from the sliding fixing body and configured to be selectively inserted into any one of the plurality of sliding fixing holes.

5. The apparatus of claim 4, wherein the sliding fixing part comprises a sliding fixing elastic member configured to press the sliding fixing body toward the guide part.

6. The apparatus of claim 4, wherein the sliding fixing part comprises:
- a sliding fixing rod extending to an outside of the first sliding part from the sliding fixing body; and
- a sliding fixing handle at an end of the sliding fixing rod.

7. The apparatus of claim 3, wherein the coupling unit comprises a rotation base part at an end of the main rod and configured to support the first sliding part so that the first sliding part is pivotable.

8. The apparatus of claim 7, wherein the coupling unit comprises a rotation fixing part coupled to the rotation base part so as to be movable toward the sliding part and configured to fix relative positions of the first sliding part and the rotation base part.

9. The apparatus of claim 8, wherein a plurality of rotation fixing holes are in the sliding part and arranged in a radial direction relative to the main rod, and
- wherein the rotation fixing part comprises a rotation fixing body movably coupled to the first sliding part and having a first side configured to be selectively inserted into any one of the plurality of rotation fixing holes.

10. The apparatus of claim 9, wherein the rotation fixing part comprises a rotation fixing elastic member configured to press the rotation fixing body toward the sliding part.

11. The apparatus of claim 9, wherein the rotation fixing part comprises:

a rotation fixing rod extending to an outside of the rotation base part from a lateral portion of the rotation fixing body; and a rotation fixing handle at an end of the rotation fixing rod.

12. The apparatus of claim 1, wherein the main rod comprises a plurality of sub-rod parts coupled to one another in series so that the plurality of sub-rod parts is attachable to or detachable from one another.

13. The apparatus of claim 1, further comprising a base frame configured to be capable of being placed on the floor, wherein the main rod extends from the base frame.

14. The apparatus of claim 13, wherein the base frame comprises:

a base part configured to support the main rod and generally having a plate shape; and a wheel rotatably coupled to one base side of the base part and configured to be rollable relative to the floor.

15. The apparatus of claim 14, wherein the main rod is positioned to be off center relative to a central portion of the base part with a position biased toward the wheel from the central portion of the base part.

16. The apparatus of claim 1, wherein the main rod comprises:

a first rod part configured to be extending from the wall surface; and a second rod part extending upward from the first rod part, wherein the coupling unit is provided at an upper end of the second rod part.

17. A support apparatus for storing an object, the support apparatus comprising:

a main rod configured to be supported by a floor or wall surface;

a coupling unit at an end of the main rod;

a support frame supported by the main rod and movably coupled to the coupling unit in a configuration so that a first center of gravity of the support apparatus storing the object is movable, wherein the support frame comprises a support part having an upper surface configured to receive the object, and wherein the support frame comprises a guide part extending from one side of the support part in a horizontal direction and configured such that the coupling unit is slidably coupled to the guide part, wherein the support part has a plate shape, and wherein the guide part is on a lower surface of the support part; and a fixing unit coupled to a first side of the support part and configured to fix the object placed on the upper surface of the support part, wherein the fixing unit comprises:

a length adjustment part coupled to the support part so as to be movable in an outward direction and configured to adjust a distance by which an end of the length adjustment part is spaced apart from the support part; and a fixing part extending upward from the end of the length adjustment part and configured to fix the object placed on the upper surface of the support part.

18. The apparatus of claim 17, wherein the fixing part is hingedly and pivotably coupled to the end of the length adjustment part.

19. The apparatus of claim 18, wherein the fixing unit comprises an object fixing elastic member configured to press the fixing part toward the length adjustment part.

20. The apparatus of claim 4, wherein the main rod comprises a plurality of sub-rod parts coupled to one another in series so that the plurality of sub-rod parts is attachable to or detachable from one another.

* * * * *